(12) United States Patent
Son et al.

(10) Patent No.: US 9,997,816 B2
(45) Date of Patent: Jun. 12, 2018

(54) MICRO-HYBRID BATTERY MODULE FOR A VEHICLE

(71) Applicant: Johnson Controls Technology Company, Holland, MI (US)

(72) Inventors: Yongkyu Son, Glendale, WI (US);
Yanting Luo, Milwaukee, WI (US);
Bernhard M. Metz, Milwaukee, WI (US); Boutros Hallac, Franklin, WI (US); Christopher R. Fell, Milwaukee, WI (US); Cheolwoo Kim, Brookfield, WI (US); Junwei Jiang, Whitefish Bay, WI (US)

(73) Assignee: Johnson Controls Technology Company, Auburn Hills, MA (US)

( * ) Notice: Subject to any disclaimer, the term of this patent is extended or adjusted under 35 U.S.C. 154(b) by 608 days.

(21) Appl. No.: 14/584,798

(22) Filed: Dec. 29, 2014

(65) Prior Publication Data

US 2015/0188207 A1 Jul. 2, 2015

Related U.S. Application Data

(60) Provisional application No. 61/923,114, filed on Jan. 2, 2014.

(51) Int. Cl.
*H01M 16/00* (2006.01)
*H01M 10/0525* (2010.01)
(Continued)

(52) U.S. Cl.
CPC ......... *H01M 16/00* (2013.01); *B60L 11/1809* (2013.01); *B60L 11/1879* (2013.01);
(Continued)

(58) Field of Classification Search
CPC .... H01M 16/00; H01M 2/021; H01M 2/0242; H01M 2/04; H01M 2/0452; H01M 2/06;
(Continued)

(56) References Cited

U.S. PATENT DOCUMENTS

| 6,558,844 B2 | 5/2003 | Howard, Jr. et al. |
| 7,924,562 B2 | 4/2011 | Soma et al. |

(Continued)

FOREIGN PATENT DOCUMENTS

| CN | 101888001 | 11/2010 |
| CN | 103427062 | 12/2013 |

(Continued)

OTHER PUBLICATIONS

Translation of WO2012/048475A1 [retrieved from https://encrypted.google.com/patents/WO2012048475A1?cl=en on Jul. 25, 2017].*

(Continued)

*Primary Examiner* — Eric R Smith
(74) *Attorney, Agent, or Firm* — Fletcher Yoder, P.C.

(57) ABSTRACT

The present disclosure relates to micro-hybrid battery modules that include at least one battery cell having a titanate-based oxide anode active material with spinel structure and a high voltage spinel ($LiMn_{2-x}M_xO_4$) cathode active material. The battery module may be configured to couple to an energy storage unit to enable the module to be used in start-stop applications.

15 Claims, 11 Drawing Sheets

(51) Int. Cl.
| | |
|---|---|
| *H01M 2/10* | (2006.01) |
| *H01M 10/42* | (2006.01) |
| *H01M 4/485* | (2010.01) |
| *H01M 4/505* | (2010.01) |
| *H01M 2/12* | (2006.01) |
| *B60L 11/18* | (2006.01) |
| *B60R 16/033* | (2006.01) |
| *H02J 7/14* | (2006.01) |
| *H01M 10/0585* | (2010.01) |

(52) U.S. Cl.
CPC ......... *B60R 16/033* (2013.01); *H01M 2/1027* (2013.01); *H01M 2/1077* (2013.01); *H01M 2/12* (2013.01); *H01M 4/485* (2013.01); *H01M 4/505* (2013.01); *H01M 10/0525* (2013.01); *H01M 10/425* (2013.01); *H01M 10/0585* (2013.01); *H01M 2010/4271* (2013.01); *H01M 2220/20* (2013.01); *H02J 2007/143* (2013.01); *Y02E 60/122* (2013.01); *Y02T 10/7011* (2013.01); *Y02T 10/7066* (2013.01)

(58) Field of Classification Search
CPC ...... H01M 2/1077; H01M 2/24; H01M 2/305; H01M 2/206; H01M 4/485; H01M 4/50; H01M 4/502; H01M 4/505; H01M 10/0445; H01M 10/0525; H01M 10/425; H01M 10/4257; H01M 10/4271; H01M 2/202; H01M 2/204; H01M 2/34; H01M 16/003; H01M 16/006; H01M 2/1011; H01M 2/1027; H01M 2/1033; H01M 2/043; F02N 11/0866; Y10T 307/724; Y10T 307/729; Y10T 307/735; H02J 7/1423; H02J 2007/143; Y02T 10/7055; Y02T 10/7061; Y02T 10/7066; B60L 11/1864; B60L 11/1866; B60L 11/1868
USPC .................................. 429/158, 159
See application file for complete search history.

(56) References Cited

U.S. PATENT DOCUMENTS

| | | | |
|---|---|---|---|
| 8,957,623 B2 | 2/2015 | Sisk et al. | |
| 9,487,090 B2 | 11/2016 | Zhang et al. | |
| 2007/0284159 A1* | 12/2007 | Takami | B60K 6/46 180/65.1 |
| 2008/0111508 A1 | 5/2008 | Dasgupta et al. | |
| 2008/0241689 A1* | 10/2008 | Takami | B60K 6/46 429/220 |
| 2009/0024265 A1 | 1/2009 | Kortschak et al. | |
| 2009/0091299 A1* | 4/2009 | Lin | H01M 10/441 320/137 |
| 2009/0141447 A1* | 6/2009 | Soma | B60K 6/445 361/694 |
| 2011/0177375 A1 | 7/2011 | Pfanner et al. | |
| 2012/0100426 A1 | 4/2012 | Kim et al. | |
| 2012/0164493 A1 | 6/2012 | Gutsch et al. | |
| 2012/0169129 A1 | 7/2012 | Kim et al. | |
| 2012/0235473 A1* | 9/2012 | Jiang | H01M 2/1072 307/9.1 |
| 2012/0286794 A1 | 11/2012 | Firehammer et al. | |
| 2012/0301750 A1 | 11/2012 | Reis et al. | |
| 2013/0029224 A1 | 1/2013 | Fusalba et al. | |
| 2014/0186659 A1 | 7/2014 | Dhar et al. | |
| 2014/0234728 A1 | 8/2014 | Jeon et al. | |

FOREIGN PATENT DOCUMENTS

| | | | | |
|---|---|---|---|---|
| CN | 103682307 | | 3/2014 | |
| DE | 102006045925 | | 4/2008 | |
| DE | 102011000490 | | 3/2012 | |
| DE | 102011016899 | | 10/2012 | |
| EP | 1921705 | | 5/2008 | |
| WO | 2010012337 | | 2/2010 | |
| WO | 2012048475 | | 4/2012 | |
| WO | WO 2012048475 A1 * | 4/2012 | .......... H01M 2/1077 |
| WO | WO 2013087742 A2 * | 6/2013 | .......... H01M 2/1072 |

OTHER PUBLICATIONS

Translation of WO2013/087742A2 [retrieved from http://translationportal.epo.org/emtp/translate/?ACTION=description-retrieval&COUNTRY=WO&ENGINE=google&FORMAT=docdb&KIND=A2&LOCALE=en_EP&NUMBER=2013087742&OPS=ops.epo.org/3.2&SRCLANG=de&TRGLANG=en on Jul. 26, 2017].*
CN 201480071466.9 Office Action dated Apr. 1, 2017.
Robert Bosch ED, "Autoelektrik Autoelektronik; Kunftige Bordnetze," Autoelektrik Autoeletronik, Stuttgart, Robert Bosch GMBH, Germany, Oct. 1, 2002, XP002655208, ISBN: 978-3-528-13872-1.
International Search Report & Written Opinion for International Application No. PCT/US2014/072630 dated Apr. 8, 2015.
Patoux, Sebastien et al., High Voltage Spinel Oxides for Li-ion Batteries: From the Material Research to the Application, Journal of Power Sources, Apr. 1, 2009, pp. 344-352, vol. 189, Issue 1, Abstract.
Sannier, Lucas, High Voltage Nickel Manganese Spinel Oxides for Li-ion Batteries, Electrochimica Acta, May 2008, Abstract, vol. 53, Issue 12, http://www.sciencedirect.com/science/article/pii/S0013468607015046.

* cited by examiner

MICRO-HYBRID BATTERY MODULE FOR A VEHICLE

CROSS REFERENCE TO RELATED APPLICATIONS

This application claims priority from and the benefit of U.S. Provisional Application Ser. No. 61/923,114, entitled "LITHIUM TITANATE-BASED SYSTEMS FOR 12V AND 48V LITHIUM ION BATTERY AUTOMOBILE APPLICATIONS," filed Jan. 2, 2014, which is hereby incorporated by reference.

BACKGROUND

The present disclosure relates generally to the field of batteries and battery modules. More specifically, the present disclosure relates to micro-hybrid battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Start-Stop" system similar to the mild hybrids, but the micro-hybrid systems may or may not supply power assist to the internal combustion engine and operate at a voltage below 60V. In some cases, a micro-hybrid system may include two battery modules, a first battery module (e.g., 12V) and a second battery module (e.g., 48V). The second battery module (e.g., 48V) may have a high energy capacity such that it is suitable for recovering braking energy, whereas the first battery module (e.g., 12V) may have a high power capacity such that it is suitable for reigniting the engine. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery module. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles and other implementations. For example, micro-hybrid battery modules may be constructed using a 12V lead acid battery and a 48V lithium ion battery. Micro-hybrid battery modules contribute a relatively large amount of weight to an xEV, which may ultimately lead to decreased fuel economy. Generally, lithium ion battery modules weigh less and have a better charge acceptance than lead acid battery modules despite being equipped with devices that control charge, control cooling, and so forth. It is now recognized that it may be desirable to simplify lithium ion battery modules, specifically those in micro-hybrid applications to improve overall vehicle performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a micro-hybrid battery module that includes a battery having a pair of battery terminals and at least one cell coupled to the pair of battery terminals. The at least one cell has a cathode and an anode, in which the anode is a titanate-based oxide with spinel structure and the cathode is high voltage spinel having a formula $LiMn_{2-x}M_xO_4$, and wherein M is nickel, chromium, iron, a transition metal, or any combination thereof and x is between 0.35 and 0.65. The micro-hybrid battery module also includes a control circuit configured to couple the at least one cell to an energy storage unit such that the micro-hybrid battery module is enabled to work in a start-stop application.

The present disclosure also relates to a micro-hybrid battery system that includes a lithium ion battery module having a first pair of battery terminals and at least one cell coupled to the first pair of battery terminals. The at least one cell has a cathode and an anode, in which the anode is a titanate-based oxide with spinel structure and the cathode is high voltage spinel having a formula $LiMn_{2-x}M_xO_4$, and wherein M is nickel, chromium, iron, a transition metal, or any combination thereof and x is between 0.35 and 0.65. The micro-hybrid battery system also includes a second battery module that has a second pair of battery terminals, and the lithium ion battery module and the second battery module are coupled in parallel via the first pair of battery terminals and the second pair of battery terminals. The system also has a control module coupled to the lithium ion battery module and the second battery module, which has a processor and a memory component. The control module is configured to control operations of both the lithium ion battery module and the second battery module. Finally, the micro-hybrid battery system includes at least one connector configured to couple the lithium ion battery module and the second battery module to at least one vehicle component.

The present disclosure further relates to a micro-hybrid battery system housing that has a first compartment and a second compartment. The first compartment is configured to house a lithium ion battery module having a first pair of battery terminals and at least one cell. The at least one cell has an anode and a cathode, in which the anode is a titanate-based oxide with spinel structure and the cathode is high voltage spinel having a formula $LiMn_{2-x}M_xO_4$, and wherein M is nickel, chromium, iron, a transition metal, or any combination thereof and x is between 0.35 and 0.65. The second compartment is configured to house a second battery module having a second pair of battery terminals. The housing also includes a cover configured to enclose the first compartment and the second compartment. The cover has an in-molded bus configured to couple the lithium ion battery module and the second battery module via the first pair of battery terminals and the second pair of battery terminals when the first compartment and the second compartment are enclosed. Finally, the micro-hybrid battery system housing has at least one connector configured to couple the lithium ion battery and the second battery module to at least one vehicle component.

DRAWINGS

Various aspects of this disclosure may be better understood upon reading the following detailed description and upon reference to the drawings in which.

DETAILED DESCRIPTION

Figure 1:
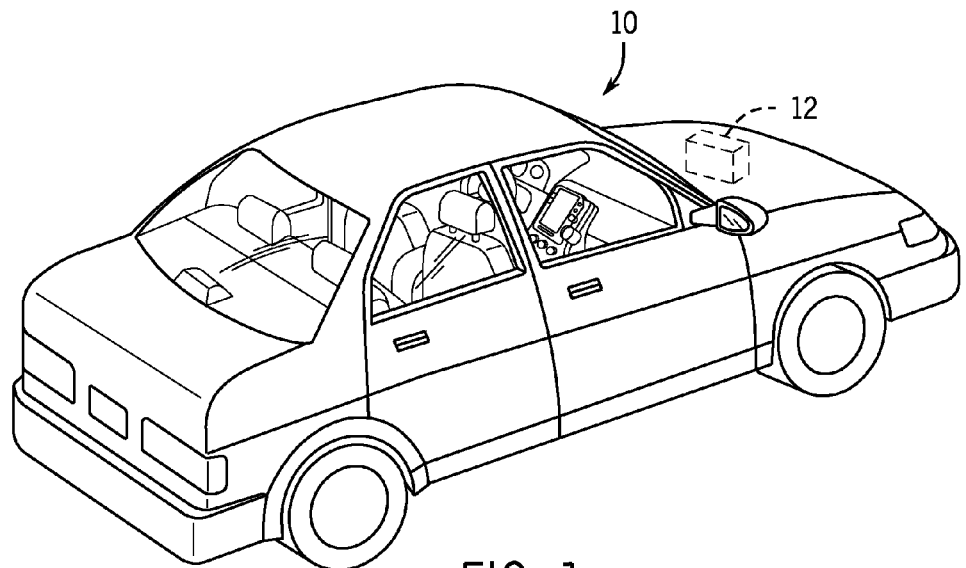
FIG. 1 is a perspective view of an xEV having a battery system configured in accordance with present embodiments to provide power for various components of the xEV, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Present embodiments are directed toward a micro-hybrid battery module including at least one electrochemical cell (which may also be referred to as a battery cell) having a titanate-based oxide with spinel structure ("LTO") as an anode active material and high voltage spinel ("HVS") as a cathode active material. A micro-hybrid battery system typically utilizes two battery modules having different voltages. For example, certain micro-hybrid battery systems may include a lead acid battery module (e.g., an open circuit voltage of 12V) and a lithium ion battery module (e.g., an open circuit voltage of 48V) coupled to one another in a parallel configuration. In certain instances, the lead acid battery module (e.g., 12V) may be used to start and/or ignite an internal combustion engine of a vehicle, whereas the lithium ion battery module (e.g., 48V) may be used to capture power from a regenerative braking system and to provide electricity to vehicle components when the internal combustion engine is idle. Micro-hybrid battery modules add weight to a vehicle, which may decrease fuel economy. Lithium ion battery modules weigh less and have a better charge acceptance than lead acid battery modules despite being equipped with devices that control charge, control cooling, and so forth. It is now recognized that simplifying lithium ion battery modules, specifically those in micro-hybrid applications, may improve overall vehicle performance.

A lithium ion battery module using LTO as an anode active material and HVS as a cathode active material ("HVS/LTO lithium ion battery module") may have the ability to meet the high power demands required to re-start an internal combustion engine because the HVS/LTO lithium ion battery module has a lower impedance value than lithium ion battery modules using a graphite-based anode active material. Additionally, an individual battery cell in an HVS/LTO lithium ion battery module may have a relatively high voltage (e.g., approximately 3.2V). Therefore, fewer cells may be required to form a battery module of a desired voltage, and thus the overall size and weight of the micro-hybrid battery system may potentially decrease. For example, a typical micro-hybrid battery system may decrease in size and/or weight by replacing a lead acid battery module with an HVS/LTO lithium ion battery module of approximately the same voltage (e.g., 12V), or replacing a lithium ion battery module having a graphite-based anode with an HVS/LTO lithium ion battery module with approximately the same voltage (e.g., 48V). Replacing either battery module of a typical micro-hybrid battery system with an HVS/LTO lithium ion battery module still enables the micro-hybrid battery system to meet the high power requirements of an xEV, but reduces the size and/or weight of the overall micro-hybrid battery system, thereby enhancing fuel economy and increasing the amount of space available for other components in the xEV. Indeed, in accordance with an embodiment, the lithium ion micro-hybrid battery module has a cold cranking capability, open circuit voltage, and capacity that is the same as a 12V automotive lead acid battery conforming to a standard form factor, and has a lower weight than the 12V automotive lead acid battery. With this in mind, the present disclosure relates to micro-hybrid battery modules that include battery cells with anode active materials that include LTO and cathode active materials that include HVS.

In certain embodiments of the present disclosure, HVS may have a chemical formula of $LiM_xMn_{2-x}O_4$, where x may be between 0.35 and 0.65 and M represents a metal, such as a transition metal. As an example, the metal (M) may be nickel, chromium, iron, or another transition metal. HVS has a spinel structure and may have a relatively high voltage. A spinel structure may refer to a chemical substance that has a cubic, close-packed lattice configuration. In certain embodiments, HVS may have the chemical formula $LiNi_{0.5}Mn_{1.5}O_4$ or $LiNi_{0.4}Mn_{1.6}O_4$, for example. Further, such embodiments of HVS may be metal doped on the nickel side (e.g., to replace a portion of the Ni) or metal doped on the manganese side (e.g., to replace a portion of the Mn). In certain embodiments, HVS has an average voltage of about 4.4V versus Li/Li+

Additionally, in certain embodiments LTO may have a spinel structure. As a non-limiting example, LTO may have a chemical formula of $Li_4Ti_5O_{12}$. LTO may be cation and/or anion doped via metal doping or electronegative atom doping, respectively. One example is metal fluorine doping. Doping may change the chemical formula of LTO to $M\text{-}Li_4Ti_5O_{12}$, where M represents a metal, such as a transition metal. As an example, the metal (M) may be barium, fluorine, strontium, molybdenum, neodymium, nickel, manganese, chromium, tungsten, lanthanum, or another transition metal. Additionally, or alternatively, LTO may be carbon coated such that the LTO may include between 0.05% and 1% by weight carbon nanotubes or carbon nanofibers. The carbon coating may enhance conductivity of the LTO, and may passivate the LTO (e.g., via a passive layer) to suppress gas generation from a reaction with electrolyte. To form carbon coated LTO, a mechanical mixing process, such as milling, may be used. In certain embodiments, LTO may have an average voltage of about 1.55V versus Li/Li+.

To help illustrate, FIG. 1 is a perspective view of an embodiment of a vehicle 10, which may utilize a micro-hybrid battery system. Although the following discussion is presented in relation to vehicles with micro-hybrid battery systems, the techniques described herein are adaptable to other vehicles that capture and/or store electrical energy with a battery or utilize electrical energy when a gas-powered engine is idle, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system (e.g., a standard 12V lead acid battery). For example, as illustrated, the vehicle 10 may include the battery system 12 positioned similarly to a lead-acid battery of a combustion-engine vehicle (e.g., under the hood of the vehicle 10).

Figure 2:
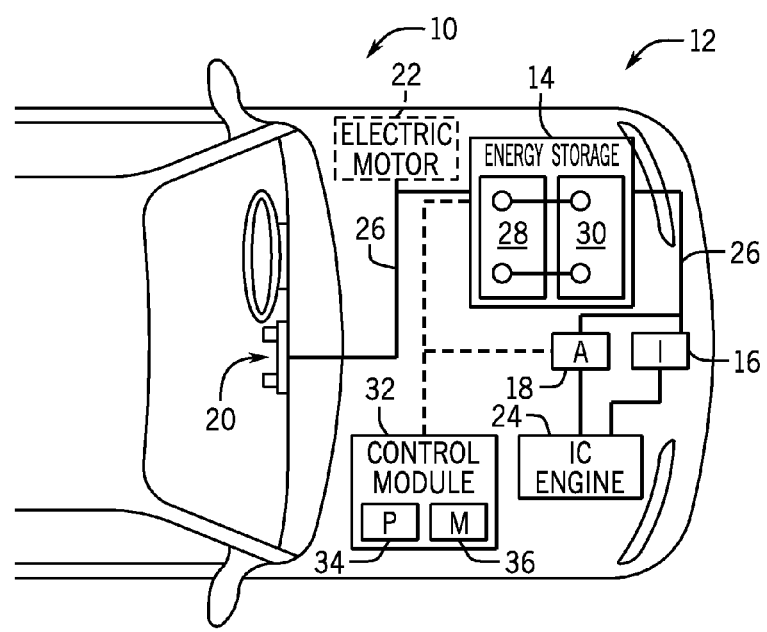
FIG. 2 is a cutaway schematic view of an embodiment of the xEV having a start-stop system that utilizes the battery system of FIG. 1, the battery system having at least one lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical components in the vehicle 10. Additionally, the energy storage component 14 may output electrical energy to start (e.g., re-start or re-ignite) an internal combustion engine 24. For example, in a start-stop application, to preserve fuel the internal combustion engine 24 may idle when the vehicle 10 stops. Thus, the energy storage component 14 may supply energy to re-start the internal combustion engine 24 when propulsion is demanded by the vehicle 10.

Therefore, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. In the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20.

Additionally, as depicted, the energy storage component 14 may include multiple battery modules. For example, in the depicted embodiment, the energy storage component 14 includes a lithium ion (e.g., a first) battery module 28 and a lead acid (e.g., a second) battery module 30, which each includes one or more battery cells. In other embodiments, the lead acid battery module 30 may be a second lithium ion battery module as will be discussed in further detail with reference to FIGS. 8, 10, and 11. Additionally, the energy storage component 14 may include any number of battery modules. Although the lithium ion battery module 28 and lead-acid battery module 30 are depicted adjacent to one another, they may be positioned in different areas around the vehicle. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

The lithium ion battery module 28, itself, may include a variety of configurations. For example, a battery cell may include anode active materials, cathode active materials, a salt, a solvent, and a separator. The battery cell's voltage depends on the various components included in the module and the chemical interactions that occur between those components. One combination of anode active materials, cathode active materials, salts, solvents, and separators, may exhibit advantageous properties over another combination. For example, using LTO as the anode active material of the lithium ion battery may be advantageous over a graphite-based anode in a variety of applications. A lithium ion battery module having LTO as the anode active material may have a lower impedance, a higher charge power and acceptance at low temperatures, and enhanced thermal stability at abnormal temperatures when compared to a lithium ion battery module with a graphite-based anode. Furthermore, using LTO as the anode active material, in combination with other approaches described herein (e.g., using HVS as the cathode active material) may enable the lithium ion battery module to be only passively cooled, which may reduce the reliance on additional thermal management components (e.g., fans, cooling ducts, and the like).

Additionally, utilizing HVS as the cathode active material may increase the voltage of a lithium ion battery cell that has an LTO anode. The increased voltage may ultimately lead to a lithium ion battery module that contains fewer battery cells, and thus has decreased weight and size. For example, a battery cell that has LTO as the anode active material and HVS as the cathode active material ("HVS/LTO battery cell") may have a voltage (e.g., an open circuit voltage) between 3.0V and 3.5V. Therefore, only four HVS/LTO battery cells may be used to form a lithium ion battery module that has a voltage of approximately 12V. Similarly, only 15 HVS/LTO battery cells may be used to form a lithium ion battery module that has a voltage of approximately 48V. Fewer battery cells may lead to a lighter, more compact, lithium ion battery module. Furthermore, an HVS/LTO lithium ion battery module may have a capacity between 5 Amp hours ("Ah") and 100 Ah, which is comparable to that of standard 12V lead acid battery modules. For example, an HVS/LTO lithium ion battery module may have a maximum capacity of 20, 24, 30, 60, 80, or 100 Ah. Indeed, in accordance with an embodiment, the lithium ion micro-hybrid battery module has a cold cranking capability (e.g., is able to provide a certain amount of power at a temperature of approximately −30° C.), open circuit voltage, and capacity that is the same as or comparable to a 12V automotive lead acid battery conforming to a standard form factor, and has a lower weight than the 12V automotive lead acid battery.

To facilitate controlling the capturing and storing of electrical energy, the battery system 12 may additionally include a control module 32 (e.g., a battery management system). More specifically, the control module 32 may control operations of components in the battery system 12, such as relays (e.g., switches) within the energy storage component 14, the alternator 18, and/or the electric motor 22. For example, the control module 32 may regulate an amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processor units 34 and one or more memory components 36. More specifically, the one or more processor units 34 may include one or more application specific integrated circuits (ASICs), one or more field programmable gate arrays (FPGAs), one or more general purpose processors, or any combination thereof. Additionally, the one or more memory components 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

It is now recognized that LTO may be used as an anode active material in a battery cell despite the fact that LTO has a relatively high voltage. Generally, when constructing a battery cell, a low voltage anode active material may be desired to increase the difference between the voltage of the cathode active material and the anode active material. However, LTO may be used as the anode active material if a higher voltage cathode active material is also utilized in the battery cell. Additionally, using LTO as an anode active material in a battery cell may have several advantages, which may be illustrated in FIGS. 3-5.

Figure 3:
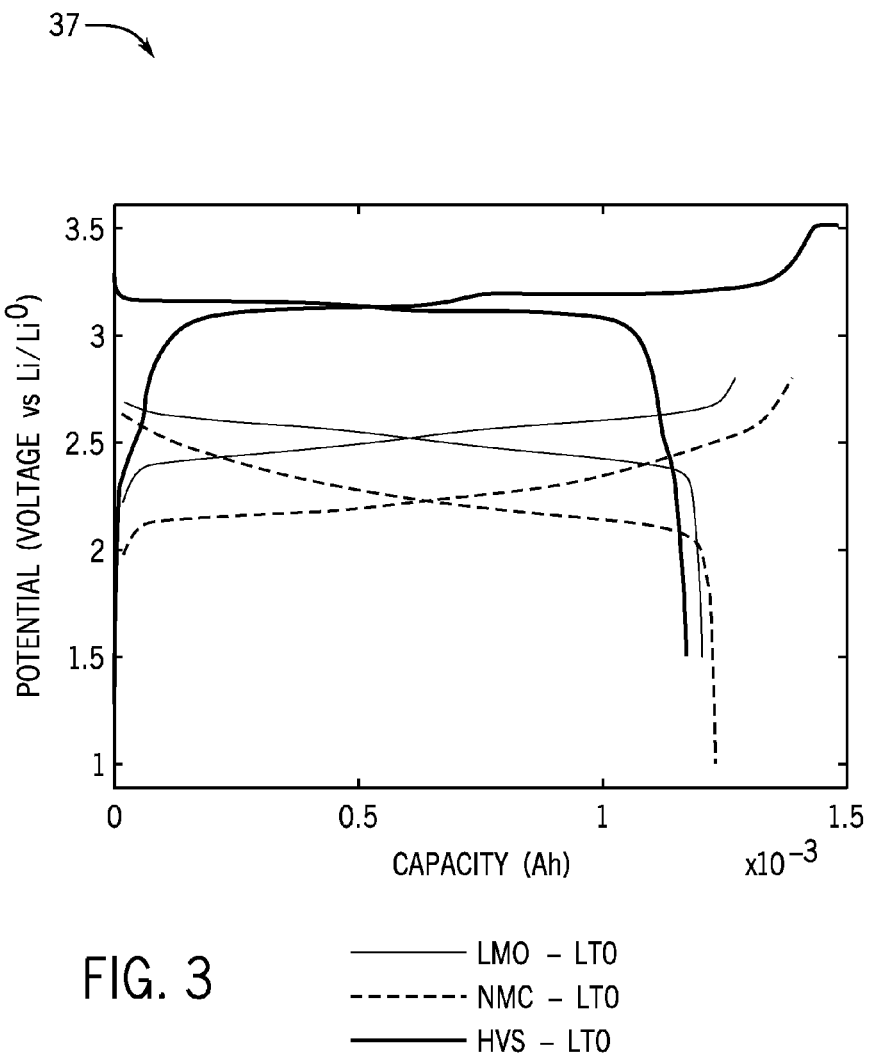
FIG. 3 is a graphical representation of voltage profiles of different lithium ion battery cells using a titanate-based oxide with spinel structure (e.g., "lithium titanate" or "LTO") as an anode active material, in accordance with an aspect of the present disclosure.

FIG. 3 is a graphical representation 37 of voltage profiles of different lithium ion battery cells using LTO as the anode active material. The three lithium ion battery cells of FIG. 3 each have a different cathode active material. The three cathode active materials illustrated in FIG. 3 are $LiMn_2O_4$ ("LMO"), $LiNi_{1/3}Mn_{1/3}Co_{1/3}O_2$ (NMC), and $LiNi_{0.5}Mn_{1.5}O_4$ (an example of HVS). The graph 37 shows that the HVS/LTO battery cell has the largest voltage of the three cathode active materials because HVS has the highest voltage, and thus creates the largest difference in voltage with LTO. As shown in the graph 37, the HVS/LTO battery cell has an average voltage of approximately 3.2V. The LMO/LTO battery cell has the next highest voltage. As shown in the graph 37, the LMO/LTO battery cell has an average voltage of approximately 2.5V. Finally, the NMC/LTO battery cell has the lowest voltage. As shown in the graph 37, the NMC/LTO battery cell has an average voltage of approximately 2.2V.

In certain embodiments, average voltage may be determined by measuring the average discharge voltage of a battery module, or battery cell, whichever the case may be, that is discharged a certain rate. As a non-limiting example, discharging may be performed at a rate of C/10 and the average discharge voltage measured.

Figure 4:
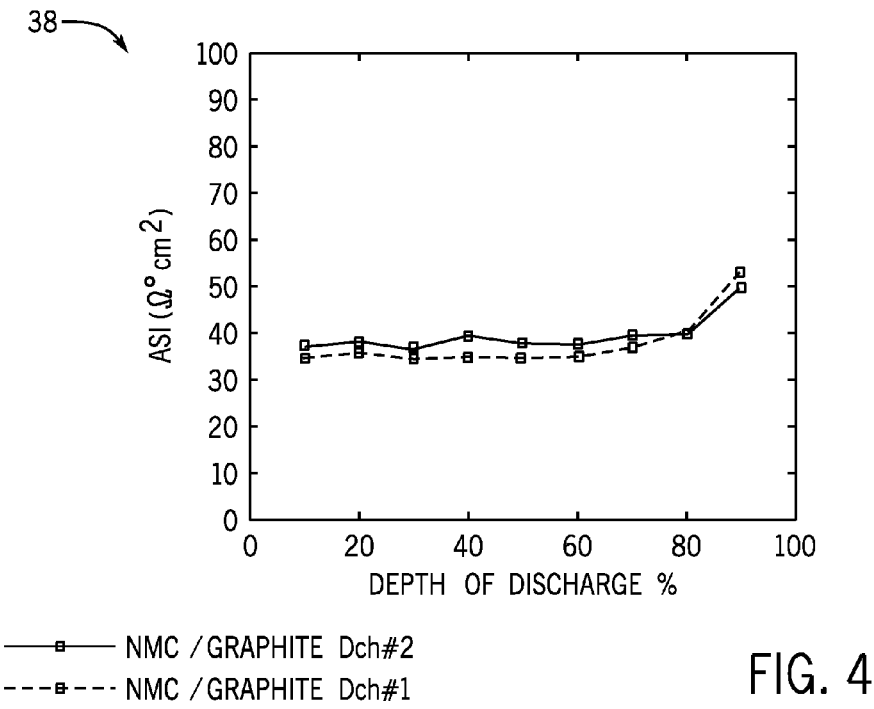
FIG. 4 is a graphical representation of impedance at different depths of discharge at room temperature for a lithium ion battery cell containing a graphite-based anode active material and $LiNi_{1/3}Mn_{1/3}Co_{1/3}O_2$ ("NMC") as a cathode active material, in accordance with an aspect of the present disclosure.
Figure 5:
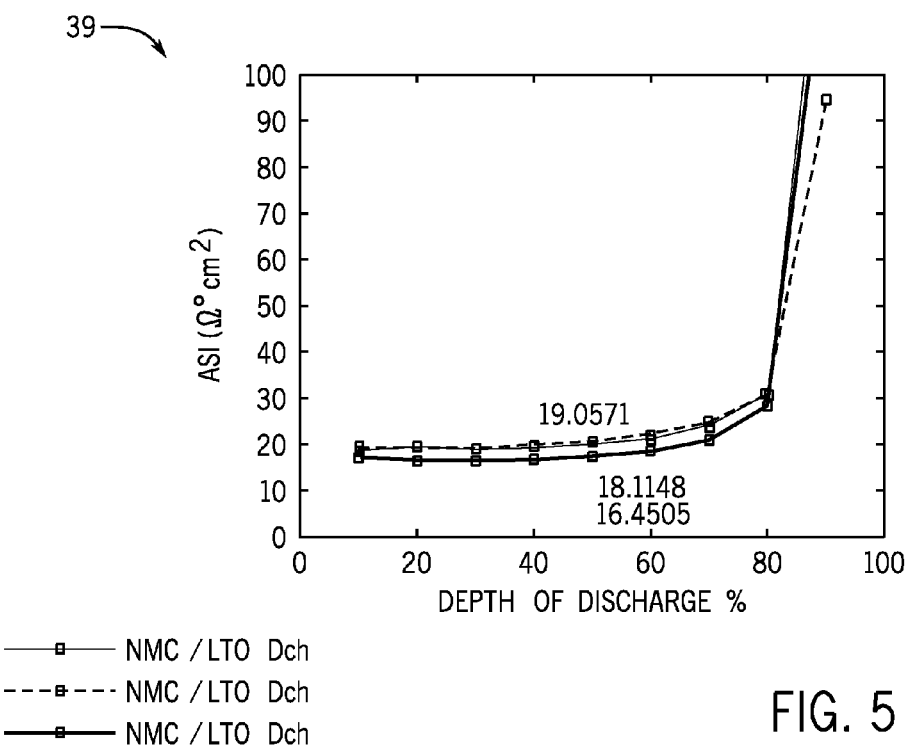
FIG. 5 is a graphical representation of impedance at different depths of discharge at room temperature for a lithium ion battery cell containing LTO as an anode active material and NMC as a cathode active material, in accordance with an aspect of the present disclosure.
Figure 6:
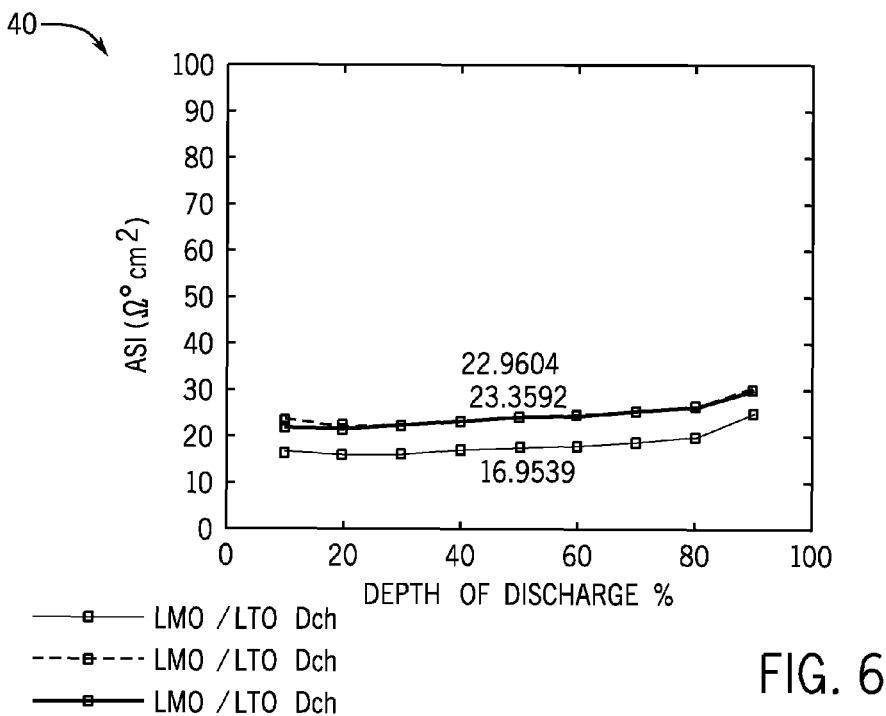
FIG. 6 is a graphical representation of impedance at different depths of discharge at room temperature for a lithium ion battery cell containing LTO as an anode active material and $LiMn_2O_4$ ("LMO") as a cathode active material, in accordance with an aspect of the present disclosure.
Figure 7:
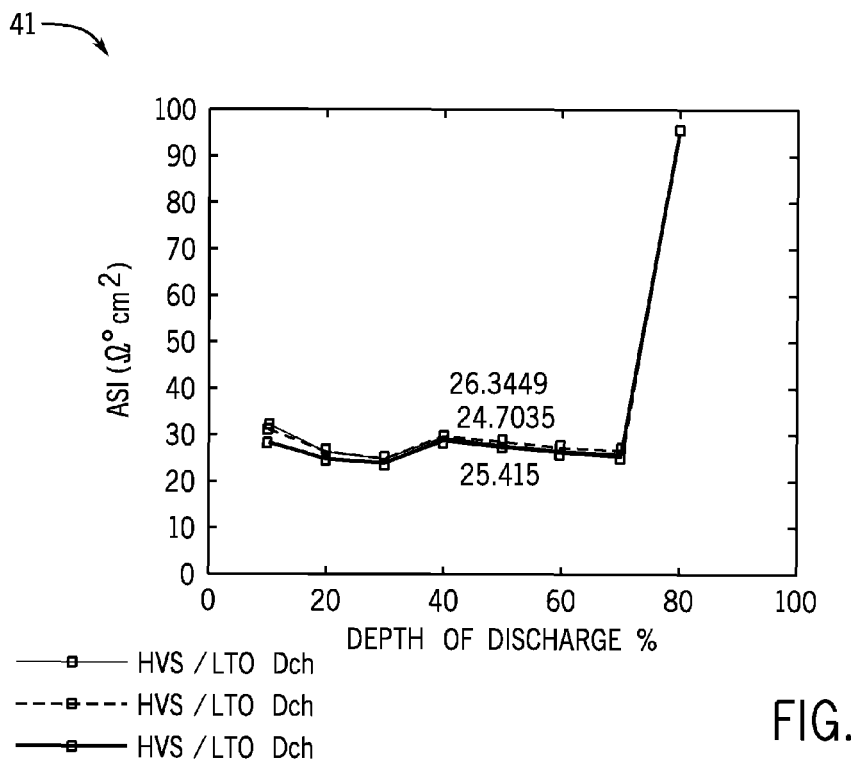
FIG. 7 is a graphical representation of impedance at different depths of discharge at room temperature for a lithium ion battery cell containing LTO as an anode active material and $LiNi_{0.5}Mn_{1.5}O_4$ (an example of a "high voltage spinel" or "HVS") as a cathode active material, in accordance with an aspect of the present disclosure.

FIGS. 4-7 are graphical representations of impedance at different depths of discharge at room temperature for different lithium ion battery cells. FIG. 4 is a graph 38 of impedance at different depths of discharge at room temperature for a lithium ion battery cell containing a graphite-based anode active material and NMC as the cathode active material. Similarly, FIG. 5 is a graph 39 of impedance at different depths of discharge at room temperature for a lithium ion battery cell having LTO as the anode active material and NMC as the cathode active material. As can be seen from FIGS. 4 and 5, the impedance of the NMC/LTO battery cell is almost half of the impedance of the NMC/graphite-based anode active material battery cell. The lower the impedance, the more power a battery cell may possess. Therefore, a lower impedance is desired. FIGS. 6 and 7 are graphs 40 and 41 of impedance at different depths of discharge at room temperature for lithium ion battery cells having LTO as the anode active material and LMO as the cathode active material, and LTO as the anode active material and HVS as the cathode active material, respectively. Again, the impedance values for the battery cells having LTO as the anode active material at room temperature are lower than the impedance values for the battery cell with a graphite-based anode active material. Therefore, it is now recognized that using LTO as the anode active material may lower impedance and lead to a battery cell with a higher power output at room temperature.

Figure 8:
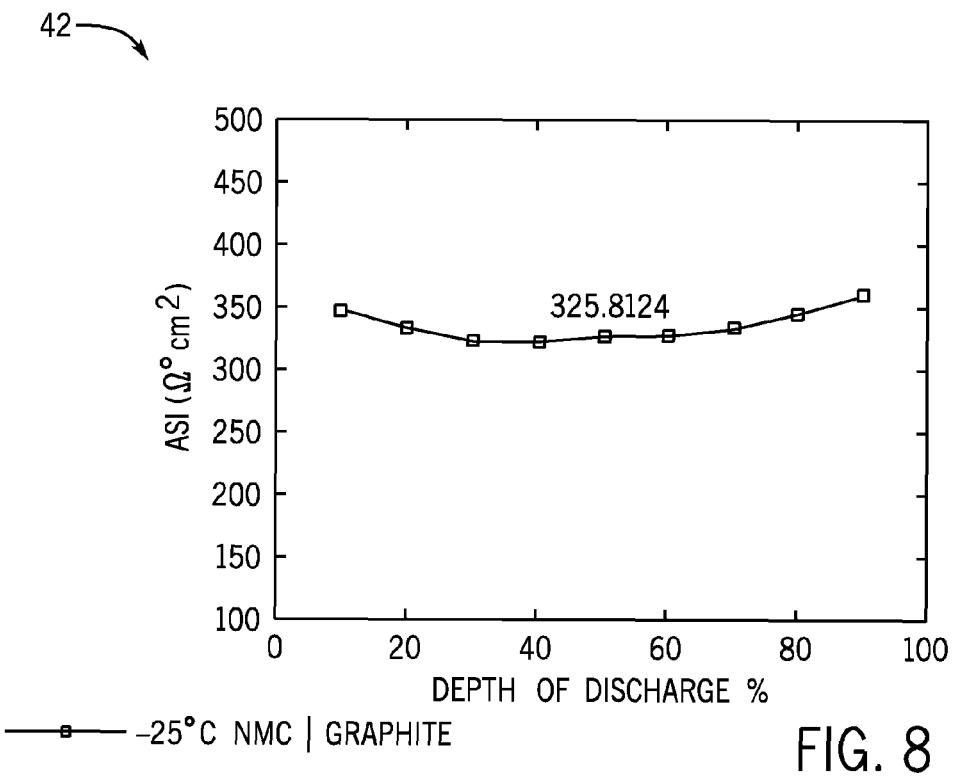
FIG. 8 is a graphical representation of impedance at different depths of discharge at a low temperature for a lithium ion battery cell containing a carbon-based anode active material and NMC as a cathode active material, in accordance with an aspect of the present disclosure.
Figure 9:
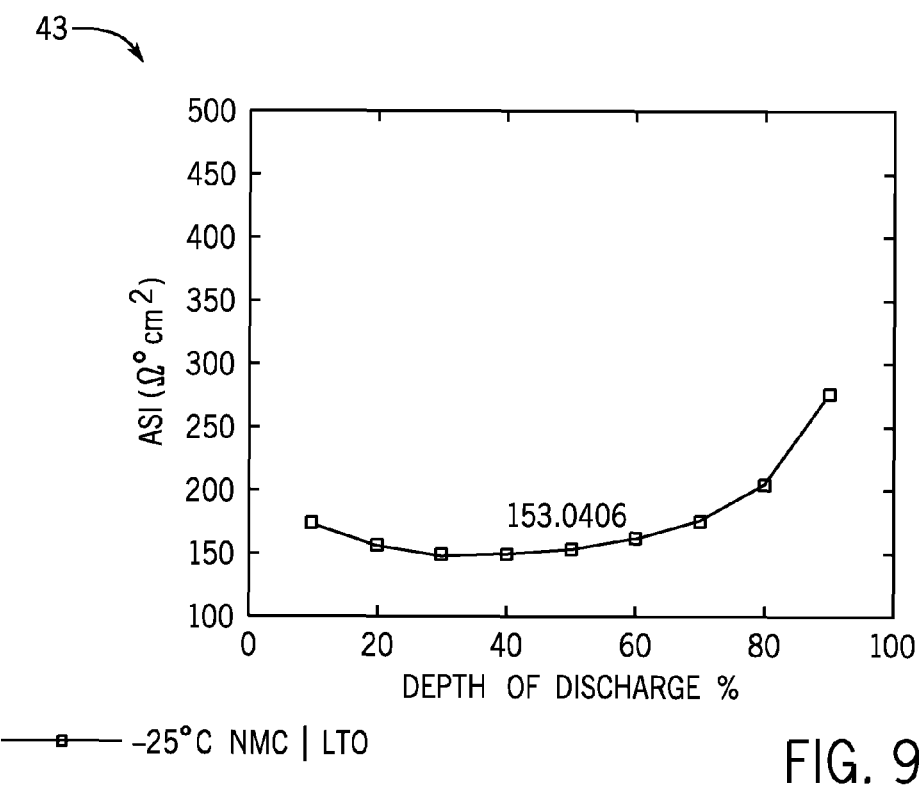
FIG. 9 is a graphical representation of impedance at different depths of discharge at a low temperature for a lithium ion battery cell containing LTO as an anode active material and NMC as a cathode active material, in accordance with an aspect of the present disclosure.

FIGS. 8 and 9 are graphical representations of impedance at different depths of discharge at a low temperature (e.g., approximately −25° C.) for different lithium ion battery cells. FIG. 8 is a graph 42 of impedance at different depths of discharge at a low temperature (e.g., approximately −25° C.) for a lithium ion battery cell containing a graphite-based anode active material and NMC as the cathode active material. Similarly, FIG. 9 is a graph 43 of impedance at different depths of discharge at a low temperature (e.g., approximately −25° C.) for a lithium ion battery cell having LTO as the anode active material and NMC as the cathode active material. As can be seen from FIGS. 8 and 9, the impedance of the NMC/LTO battery cell is nearly half of the impedance of the NMC/graphite-based anode active material battery cell. The lower the impedance, the more power a battery cell may possess. Therefore, it is now recognized that using LTO as the anode active material may lower impedance and lead to a battery cell with a higher power output even at low temperatures (e.g., approximately −25° C.).

FIGS. 3-9 illustrate the advantages of using LTO as the anode active material over a graphite based anode active material. For example, an LTO anode active material may enable a battery module to possess fewer battery cells, which in turn, causes the overall battery system to decrease in size and weight. Additionally, lithium ion battery modules with LTO as the anode active material may have increased power output over those lithium ion battery modules with graphite-based anode active materials. Therefore, it is now recognized that lithium ion battery modules with LTO as the anode active material are desirable. Accordingly, embodiments of the present disclosure may replace lithium ion battery modules with graphite-based anode active materials and lead acid battery modules with lithium ion battery modules having LTO as the anode active material. Further, lithium ion battery modules configured in accordance with certain aspects of the present disclosure are configured to enable micro-hybrid battery systems to function without a lead-acid battery because of their increased power output, reduced impedance, lighter weight, and so forth, relative to other lithium ion battery module configurations.

Figure 10:
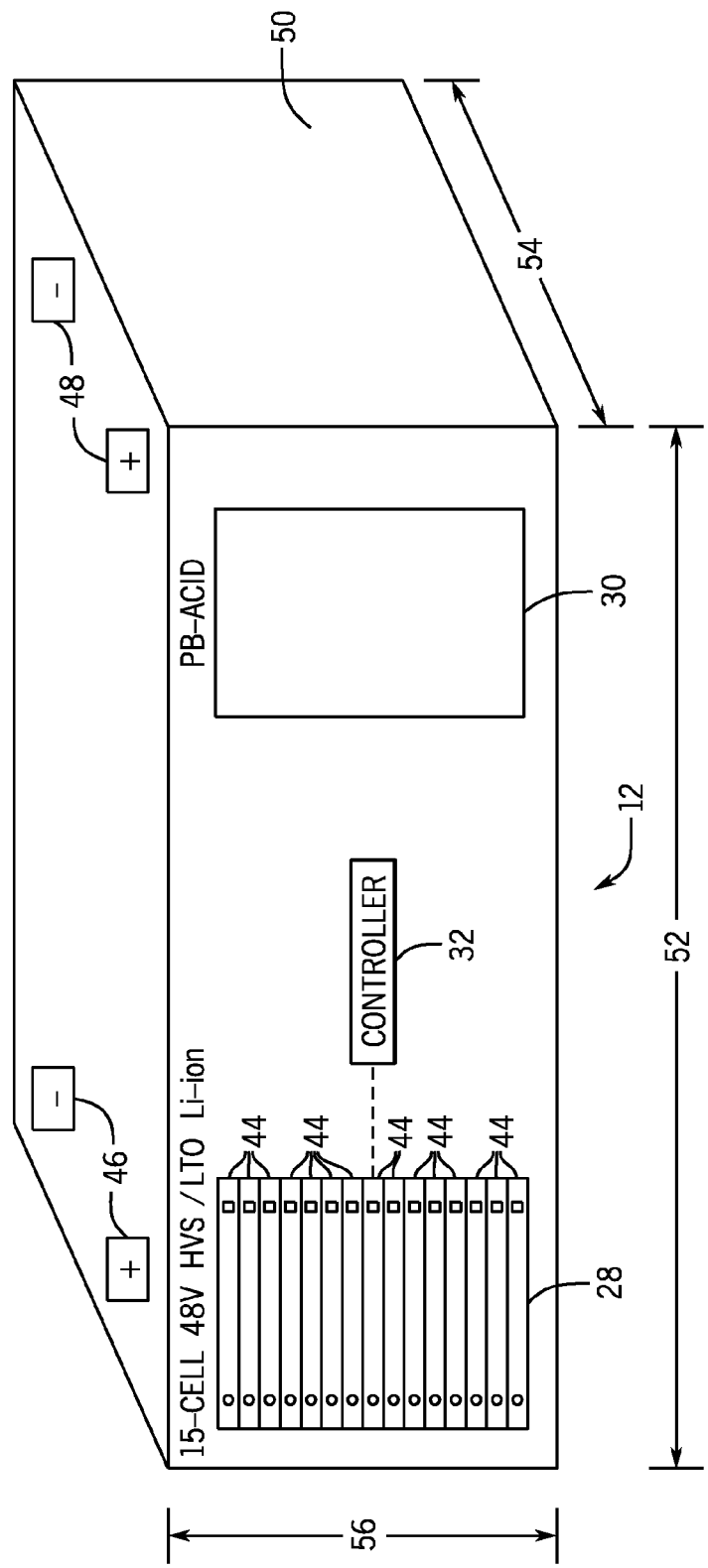
FIG. 10 is a perspective view of an embodiment of the micro-hybrid battery system of FIG. 2, in accordance with an aspect of the present disclosure.

FIG. 10 is a perspective view of an embodiment of the micro-hybrid battery system 12 of FIG. 2. The micro-hybrid battery system 12 includes an HVS/LTO lithium ion battery module (e.g., 48V) as an embodiment of the lithium ion battery module 28 and the lead acid battery module (e.g., 12V) 30. The micro-hybrid battery system 12 of FIG. 10 uses the HVS/LTO lithium ion battery module (e.g., 48V) 28 rather than a lithium ion battery module with a graphite-based anode (e.g., 48V) to decrease the size and weight of the micro-hybrid battery system 12 and to increase power output. The HVS/LTO lithium ion battery module 28 may include only 15 HVS/LTO battery cells 44. In contrast to the presently disclosed lithium ion battery modules, a lithium ion battery module with other anode active materials may, for example, require up to 25 battery cells to achieve a 48V total. Therefore, by incorporating an HVS/LTO lithium ion battery module (e.g., 48V) 28, the overall micro-hybrid battery system 12 may decrease in both size and weight as a result of fewer battery cells being included in the system 12.

In certain embodiments, the HVS/LTO lithium ion battery module (e.g., 48V) 28 includes a first pair of battery terminals 46 and the lead acid battery module (e.g., 12V) 30 includes a second pair of battery terminals 48. The battery terminals 46, 48 may connect, or electrically couple, the battery modules 28, 30 to vehicle components so that the battery modules 28, 30 may supply or receive electricity to or from the vehicle components. For example, the lead acid battery module (e.g., 12V) 30 may be electrically coupled to the ignition system 16 of the vehicle 10 so that it may supply power to start, or re-start, the internal combustion engine 24. Additionally, the HVS/LTO lithium ion battery module (e.g., 48V) 28 may be electrically coupled to the alternator 18 (e.g., via a connection to an electrical bus of the xEV 10) to recover power when the vehicle 10 is braking. In certain embodiments, the HVS/LTO lithium ion battery module (e.g., 48V) 28 may also be electrically coupled to other vehicle components, such as an air conditioner, a radio, or the vehicle console 20, via the electrical bus 26, for instance using a connector attached to the bus 26, to the module 28, or any other suitable location. In certain embodiments, the battery terminals 46, 48 may be connected to each other in parallel. Connecting the terminals 46, 48 in parallel may enable the control unit 32 to control whether electricity flows to or from a given module 28, 30 and may also enable both modules to be connected to a main vehicle bus, simplifying wiring.

The micro-hybrid battery system 12 illustrated in FIG. 10 includes an enclosure 50 that houses both the lithium ion battery module (e.g., 48V) 28 and the lead acid battery module (e.g., 12V) 30. However, in certain embodiments, the lithium ion battery module (e.g., 48V) 28 and the lead acid battery module (e.g., 12V) 30 may be enclosed in separate, module housings before being placed into the micro-hybrid battery system 12 enclosure 50.

In certain embodiments, the enclosure 50 may be constructed to have dimensions that conform to a standard form factor 12V lead acid battery module. For example, the housing 50 may have a length 52, width 54, and height 56 conforming to a standard 12V lead acid battery module form factor (e.g., a form factor larger than the module 30, but still conforming to a lead acid standard). Constructing the enclosure 50 with substantially the same dimensions as a standard 12V lead acid battery may enable the micro-hybrid battery system 12 to be installed directly in a location of the vehicle 10 originally intended for a standard 12V lead acid battery module. In certain embodiments, the standard form factor of a 12V lead acid battery module may be a Battery Council International group designation 21, 22F, 22HF, 22NF, 22R, 24, 24F, 24H, 24R, 24T, 25, 26, 26R, 27, 27F, 27H, 29NF, 31, 31A, 31T, 33, 34, 34/78, 34R, 35, 36R, 40R, 41, 42, 43, 45, 46, 47, 48, 49, 50, 51, 51R, 52, 53, 54, 55, 56, 57, 58, 58R, 59, 60, 61, 62, 63, 64, 65, 70, 71, 72, 73, 74, 75, 75/25, 76, 78, 85, 86, 90, 91, 92, 93, 95R, 96R, 97R, 98R, 1, 2, 2E, 2N, 17HF, 4D, 6D, 8D, 28, 29H, 30H, 31, GC2, or GC2H.

In certain embodiments, the micro-hybrid battery system 12 may include the control unit 32 that controls and monitors the HVS/LTO lithium ion battery module (e.g., 48V) 28. The control unit 32 may be coupled to various sensors that are included in the separate, smaller housing for the HVS/LTO lithium ion battery module (e.g., 48V) 28. For example, sensors may monitor the temperature, voltage, capacitance, resistance, cell pressure, and/or other operating conditions of the HVS/LTO lithium ion battery module (e.g., 48V) 28. The sensors may then send signals to the control unit 32, which may include the processor units 34 and memory components 36, related to a measured operating condition of the HVS/LTO lithium ion battery module (e.g., 48V) 28. The control unit 32 may compare the measured operating condition to a desired operating condition. If the measured operating condition is too high or too low in comparison to the desired operating condition, the control unit 32 may send a signal to a relay or other device configured to stop the flow of electricity from the HVS/LTO lithium ion battery module (e.g., 48V) 28. For example, if the control unit 32 receives a temperature value from a thermocouple sensor signaling that the HVS/LTO lithium ion battery module (e.g., 48V) 28 is overheating, the control unit 32 may disconnect the flow of electricity to the HVS/LTO lithium ion battery module (e.g., 48V) 28.

It may be desirable to have a micro-hybrid battery system 12 that fits in a location of the vehicle 10 designed to fit a standard form lead acid battery module that is larger than the lead acid battery module 30. Further, it may be desirable to have a system that allows a purchaser of the lead acid battery module 30 to place the lead acid battery module 30 in an integrated enclosure that comes equipped with the lithium ion battery module 28. Such a system may make installing the micro-hybrid battery system 12 less complex and easier.

Figure 11:
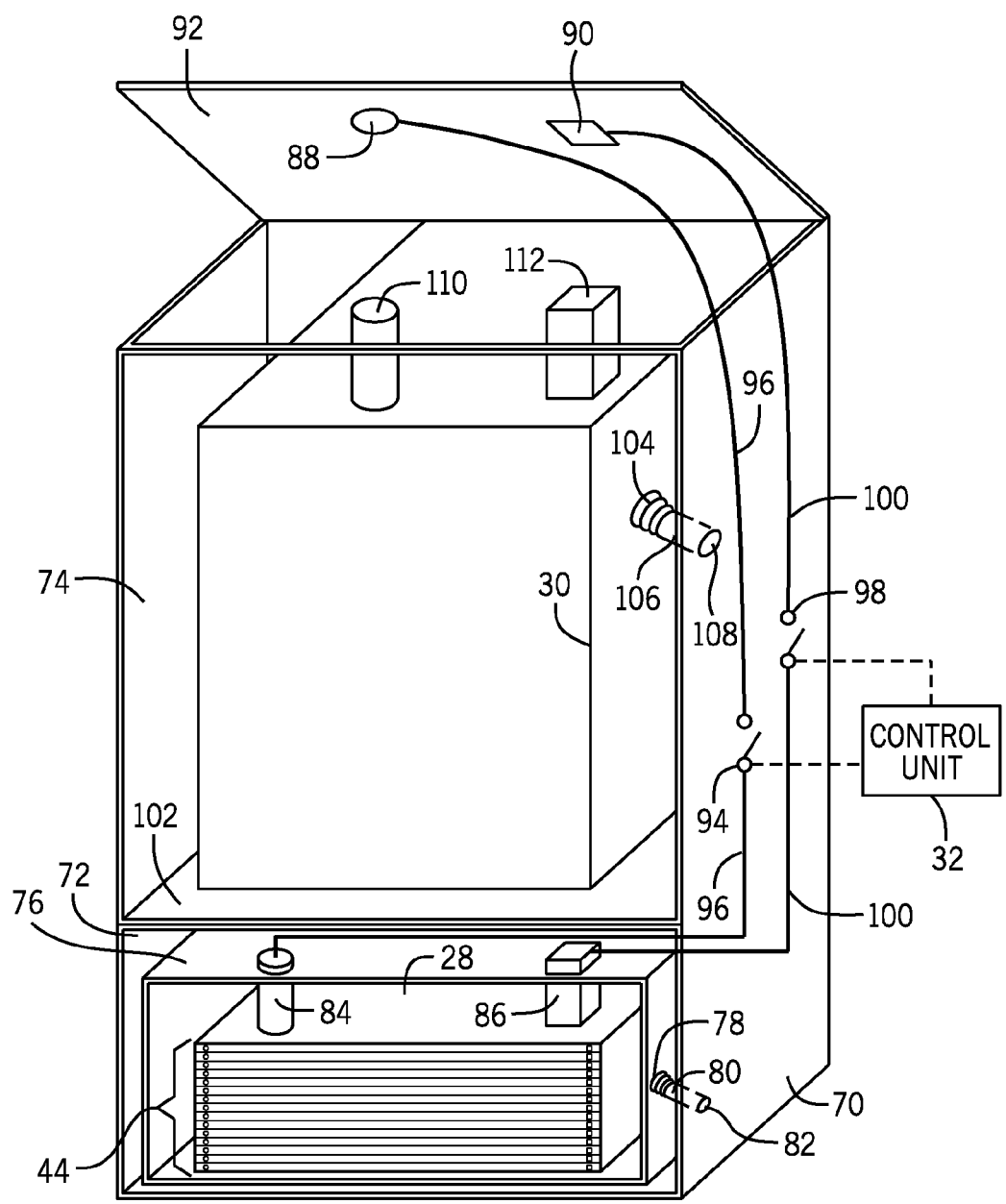
FIG. 11 is a perspective view of another embodiment of the micro-hybrid battery system of FIG. 2, in accordance with an aspect of the present disclosure.

FIG. 11 is a perspective view of another embodiment of the micro-hybrid battery system 12 of FIG. 2 that also includes an HVS/LTO lithium ion battery module (e.g., 48V) as an embodiment of the lithium ion battery module 28 and the lead acid battery module 30. The micro-hybrid battery system 12 of FIG. 11 includes an integrated enclosure 70 that includes a first compartment 72 and a second compartment 74. In certain embodiments, the first compartment 72 may be configured to house the HVS/LTO lithium ion battery module (e.g., 48V) 28. As illustrated in FIG. 11, the 15 HVS/LTO battery cells 44 of the HVS/LTO lithium ion battery module (e.g., 48V) 28 are also housed in a module housing 76.

The module housing 76 may include a first vent 78 configured to allow gases and other chemicals that build within the separate housing 76 to escape so that the pressure within the separate housing 76 does not exceed a certain pressure level (e.g., a threshold pressure). The first vent 78 may be in the form of a barbed fitting as shown in FIG. 11. Alternatively, the first vent 78 may be a hole in the separate housing 76, a check valve, or any other device that may be used to allow fluid to escape from the separate housing 76. In the embodiment shown in FIG. 11, a first vent hose 80 is connected to the barbed fitting and then to a first opening 82 in the enclosure 70. Therefore, gas or other fluids building in the separate housing 76 may flow through the first vent 78, into the first vent hose 80, and out of the first opening 82 to the atmosphere or a vent hose of the xEV 10.

Additionally, the pair of battery terminals 46 may protrude from the separate housing 76 and into the first compartment 72. In the illustrated embodiment, the pair of battery terminals 46 includes a positive terminal 84 and a negative terminal 86 coupled to positive and negative electrical contacts 88, 90, respectively. The contacts 88, 90 may be disposed on a lid 92 of the enclosure 70. In certain embodiments a relay 94 may be disposed along circuitry 96 coupling the positive terminal 84 and the positive electrical contact 88. In other embodiments, a relay 98 may be disposed along circuitry 100 that electrically couples the negative terminal 86 to the negative electrical contact 90. The relay 94 or the relay 98 may be configured to couple or de-couple the lithium ion battery module 28 from a bus to which the lead acid battery module 30 and a load are connected. In certain embodiments, the control unit 32 may control the position of the relay 94 or the relay 98 by sending a signal commanding the relay 94 or the relay 98 to either open or close. For example, as will be discussed below, the lead acid battery module (e.g., 12V) 30 and the HVS/LTO lithium ion battery module (e.g., 48V) 28 may be coupled to one another via the positive electrical contact 88 and the negative electrical contact 90. Therefore, in certain embodiments, the control unit 32 may be able to control from which of the battery modules 28, 30, electricity flows to or from.

The second compartment 74 of the enclosure 70 may house the lead acid battery module (e.g., 12V) 30. The second compartment 74 may be separated from the first compartment 72 by a barrier 102. The barrier 102 may be constructed of the same or different material as the enclosure 70 depending on the desired properties of the barrier 102 compared to the properties of enclosure 70. In certain configurations, the enclosure 70 may be configured such that a standard form factor lead acid battery module (e.g., 12V) 30 may be disposed directly into the second compartment 72 without any modifications. In certain embodiments, the lead acid battery module (e.g., 12V) 30 may be placed directly on the bather 102. In other embodiments, the lead acid battery module (e.g., 12V) 30 may rest on a shelf or other platform disposed in the second compartment 72. As mentioned previously, the standard form factor of a 12V lead acid battery module may be a Battery Council International group designation 21, 22F, 22HF, 22NF, 22R, 24, 24F, 24H, 24R, 24T, 25, 26, 26R, 27, 27F, 27H, 29NF, 31, 31A, 31T, 33, 34, 34/78, 34R, 35, 36R, 40R, 41, 42, 43, 45, 46, 47, 48, 49, 50, 51, 51R, 52, 53, 54, 55, 56, 57, 58, 58R, 59, 60, 61, 62, 63, 64, 65, 70, 71, 72, 73, 74, 75, 75/25, 76, 78, 85, 86, 90, 91, 92, 93, 95R, 96R, 97R, 98R, 1, 2, 2E, 2N, 17HF, 4D, 6D, 8D, 28, 29H, 30H, 31, GC2, or GC2H.

Similar to the HVS/LTO lithium ion battery module (e.g., 48V) 28, the lead acid battery module (e.g., 12V) 30 may also be enclosed in a separate, module housing. Additionally, the lead acid battery module (e.g., 12V) 30 may include a second vent 104 configured to allow for gases and other chemicals that build within the lead acid battery module (e.g., 12V) 30 to escape so that the pressure does not exceed a certain pressure level (e.g., a threshold pressure). The second vent 104 may be in the form of a barbed fitting as shown in FIG. 11. Alternatively, the second vent 104 may be a hole in the separate housing, a check valve, or any other device that may be used to allow a fluid to escape from the lead acid battery module (e.g., 12V) 30. In the embodiment shown in FIG. 11, a second vent hose 106 is connected to the barbed fitting and then to a second opening 108 in the housing 70. Therefore, gas or other fluids building in the lead acid battery module (e.g., 12V) 30 may flow through the second vent 104, into the second vent hose 106, and out of the second opening 108 to the atmosphere or a vent hose of the xEV 10.

Additionally, the lead acid battery module (e.g., 12V) 30 includes the pair of battery terminals 48, which may protrude from the module housing and into the second compartment 74. In the illustrated embodiment, the second pair of battery terminals 48 includes a second positive terminal 110 and a second negative terminal 112. In certain embodiments, the enclosure 70 is configured such that when a standard form factor lead acid battery (e.g., designed according to a standard form factor) is disposed in the enclosure 70, the second positive terminal 110 aligns with the positive electrical contact 88 and the second negative terminal 112 aligns with the negative electrical contact 90. Therefore, when the lid 92 of the housing 70 is closed, an electrical connection is formed between the positive electrical contact 88 and the second positive terminal 110 and between the negative electrical contact 90 and the second negative terminal 112. In certain configurations, the electrical connection between the second terminals 110, 112 and the electrical contact 88, 90 may couple the lead acid battery module (e.g., 12V) 30 to the HVS/LTO lithium ion battery module (e.g., 48V) 28 in a parallel configuration.

Although the lead acid battery module 30 can meet the high power demand to re-start an internal combustion engine of the xEV vehicle 10, the lead acid battery module 30 generally has a relatively short life cycle, a low charge acceptance, and is relatively heavy when compared to the lithium ion battery module 28. The lithium ion battery module 28, on the other hand, generally has a high charge capacity, which makes it suitable for capturing power (e.g., from a regenerative braking system). However, some lithium ion battery modules may not have the ability to meet the high power demands required to re-start an internal combustion engine. As discussed above, lithium ion battery modules containing HVS/LTO battery cells may still meet these high power demands. In addition, HVS/LTO battery cells have a higher voltage than lead acid battery cells and other lithium ion battery cells with LTO-based anode active materials. Therefore, a lithium ion HVS/LTO battery module may be smaller, lighter, and have a higher power output than lead acid battery modules and lithium ion battery modules having graphite-based anode active materials. Therefore, utilizing lithium ion battery modules with HVS/LTO battery cells may reduce the weight of the xEV and enhance fuel efficiency.

Figure 12:
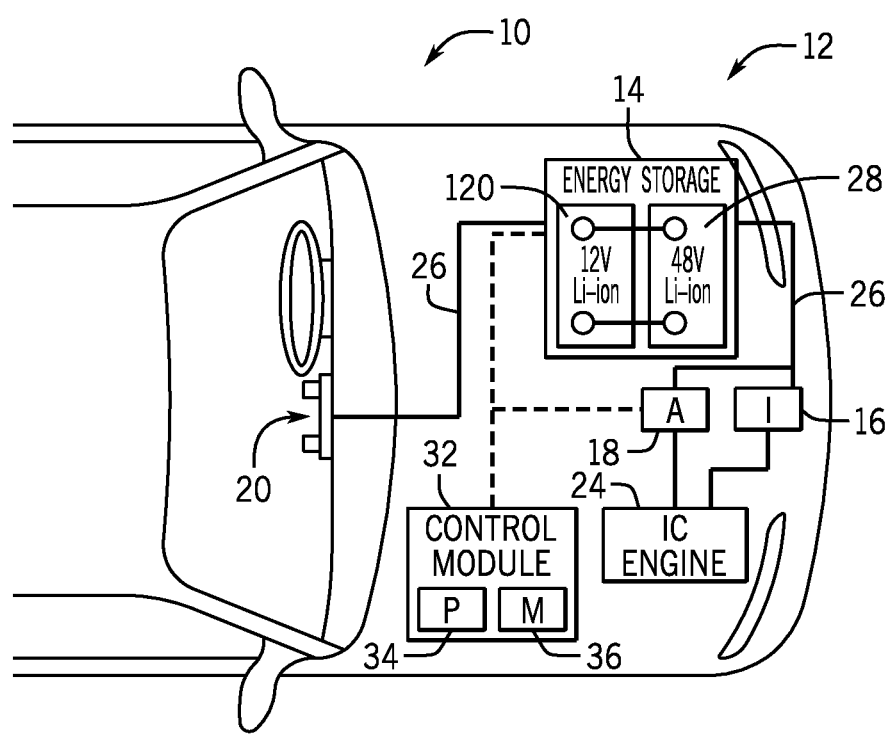
FIG. 12 is a cutaway schematic view of an embodiment of the xEV of FIG. 1 with a battery system having two lithium ion battery modules, in accordance with an aspect of the present disclosure.

FIG. 12 is a perspective view of an embodiment of the micro-hybrid battery system 12 of FIG. 2 that includes two lithium ion battery modules 120, 28. As illustrated, the micro-hybrid battery system 12 has a first lithium ion battery module (e.g., 48V) as an embodiment of the lithium ion battery module 28 and a second lithium ion battery module (e.g., 12V) 120. In certain embodiments, the first lithium ion battery module (e.g., 48V) 28 may include at least one HVS/LTO battery cell, or specifically, the first lithium ion battery module (e.g., 48V) 28 may include 15 HVS/LTO battery cells. In other embodiments, the first lithium ion battery module (e.g., 48V) 28 may include no HVS/LTO battery cells, but may use other lithium ion chemistries to achieve certain results. Additionally, in certain embodiments the second lithium ion battery module (e.g., 12V) 120 may include at least one HVS/LTO battery cell, or specifically, the second lithium ion battery module (e.g., 12V) 120 may have 4 HVS/LTO battery cells. In other embodiments, the second lithium ion battery module (e.g., 12V) 120 may not include any HVS/LTO battery cells. Thus, either or both of the modules may use HVS/LTO battery cells.

In certain embodiments, the micro-hybrid battery system 12 may include the second lithium ion battery module (e.g., 12V) 120 having 4 HVS/LTO battery cells and the first lithium ion battery module (e.g., 48V) 28 having 15 HVS/LTO battery cells. Therefore, in accordance with one aspect of the present disclosure, the micro-hybrid battery system 12 may include the second HVS/LTO lithium ion battery module (e.g., 12V) 120 that replaces, for example, a lead acid battery module of approximately the same voltage (e.g., 48V). It may be advantageous to replace the lead acid battery module 30 with the second lithium ion battery module (e.g., 12V) 120 that includes 4 HVS/LTO battery cells. As discussed previously, an HVS/LTO battery cell may have a relatively high voltage (between 3.0V and 3.5V). The high voltage may ultimately lead to a lithium ion battery module containing less battery cells. Fewer battery cells may enable the manufacturing of a lighter, more compact, battery system. Moreover, lead acid battery modules can weigh more and use more space than lithium ion battery modules with the same voltage. Decreasing the number of cells in a lithium ion battery module can further increase the size and weight disparity between lead acid battery modules and lithium ion modules, thereby reducing a weight of the xEV 10 and enhancing efficiency.

Such replacement may be possible because lithium ion battery modules that include HVS/LTO battery cells exhibit properties that closely resemble those of a lead acid battery. For example, a lithium ion battery module that includes HVS/LTO battery cells exhibit capacity and discharge capabilities resembling that of a lead acid battery module. Therefore, the size and weight advantages of a lithium ion battery module over a lead acid battery module are not offset by substantially inferior performance. In certain embodiments, the micro-hybrid battery system shown in FIG. 12 may have a capacity between 5 Ah and 100 Ah.

Figure 13:
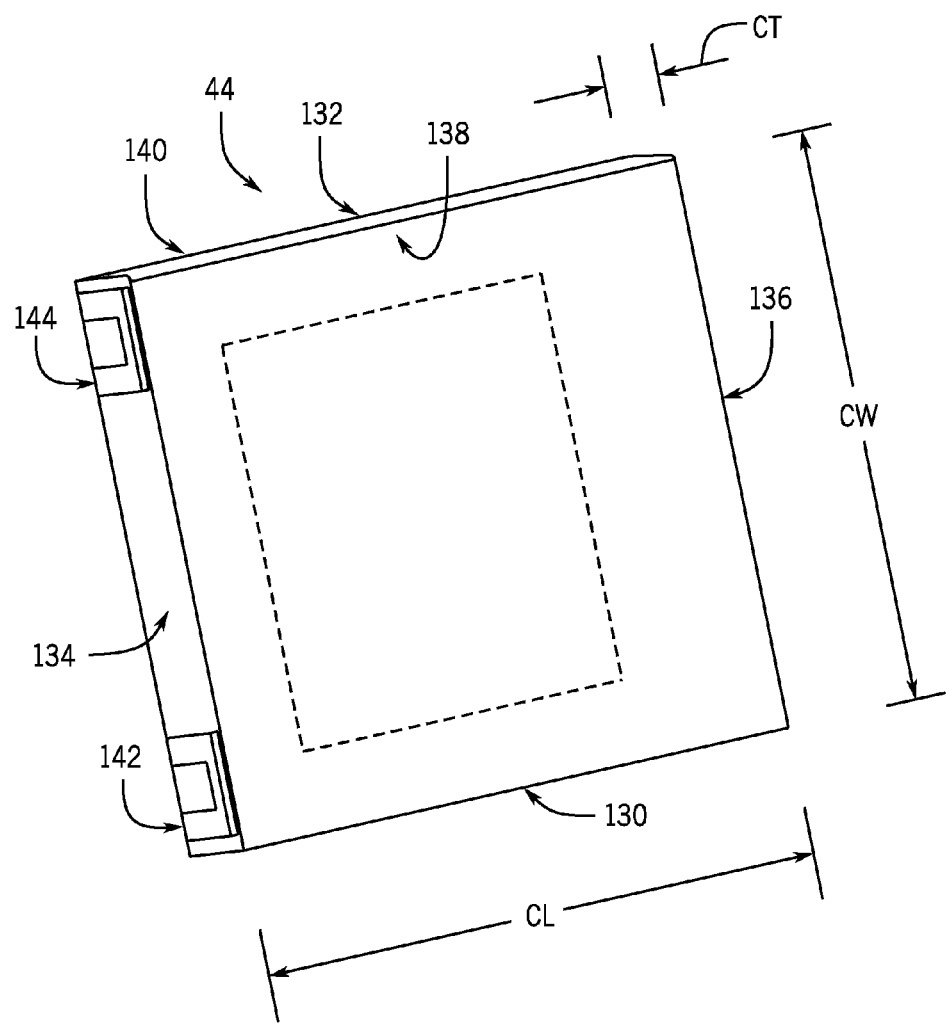
FIG. 13 is a perspective view of a prismatic cell of a lithium ion battery module, in accordance with an aspect of the present disclosure.

FIG. 13 is a perspective view of a prismatic cell (e.g., an HVS/LTO battery cell) that may be used with the first HVS/LTO lithium ion battery module (e.g., 48V) 28 or the second HVS/LTO lithium ion battery module (e.g., 12V) 120. The battery cells 44 described herein may generally have any configuration, such as prismatic, cylindrical, or pouch, where a prismatic shape generally includes a rectangular shape. Dimensions of the prismatic battery cell 44, as shown in FIG. 13, include a cell length (CL) along rounded sides 130, 132, a cell width (CW) along the top and bottom portions 134, 136, and a cell thickness (CT) extending between the first and second faces 138, 140. As a non-limiting example, the battery module 28 may be designed to have an H5 base with a 12V or a 48V output, and a 10 Ah or 20 Ah capacity, using cells 44 that have a CL, a CW, and a CT appropriately selected to accommodate such a size. However, the cell dimensions may vary, depending on the desired dimensions of the modules 28, 120. The chemistry of the cell, in such embodiments, may include HVS as a cathode active material and LTO as an anode active material.

In a more general sense, the embodiment of the prismatic battery cell 44 shown in FIG. 13 includes first and second terminals 142, 144, which may include the same or different metals, depending on the anode and cathode active materials. Generally, the cathode terminal (e.g., terminal 144) may be an aluminum terminal. However, different anode active materials may utilize different terminal materials. For example, in embodiments where the anode active material includes graphite, the anode terminal (e.g., terminal 142) will generally be copper. On the other hand, in embodiments where the anode active material is LTO, the anode terminal may be aluminum. Indeed, it is now recognized that in embodiments where the battery cells 44 use LTO as the anode active material (e.g., as in an HVS/LTO cell), bimetallic regions in the battery module 28 may be reduced or eliminated. For example, in such embodiments, bus bar connections between anode and cathode cell terminals may use a single conductive material (e.g., aluminum), rather than a mixture of conductive materials (e.g., aluminum and copper) that would otherwise cause unwanted galvanic effects. The illustrated terminals 142, 144 are also shown as being flat. However, in other embodiments, the terminals 142, 144 may be post terminals, or have any other suitable configuration.

Figure 14:
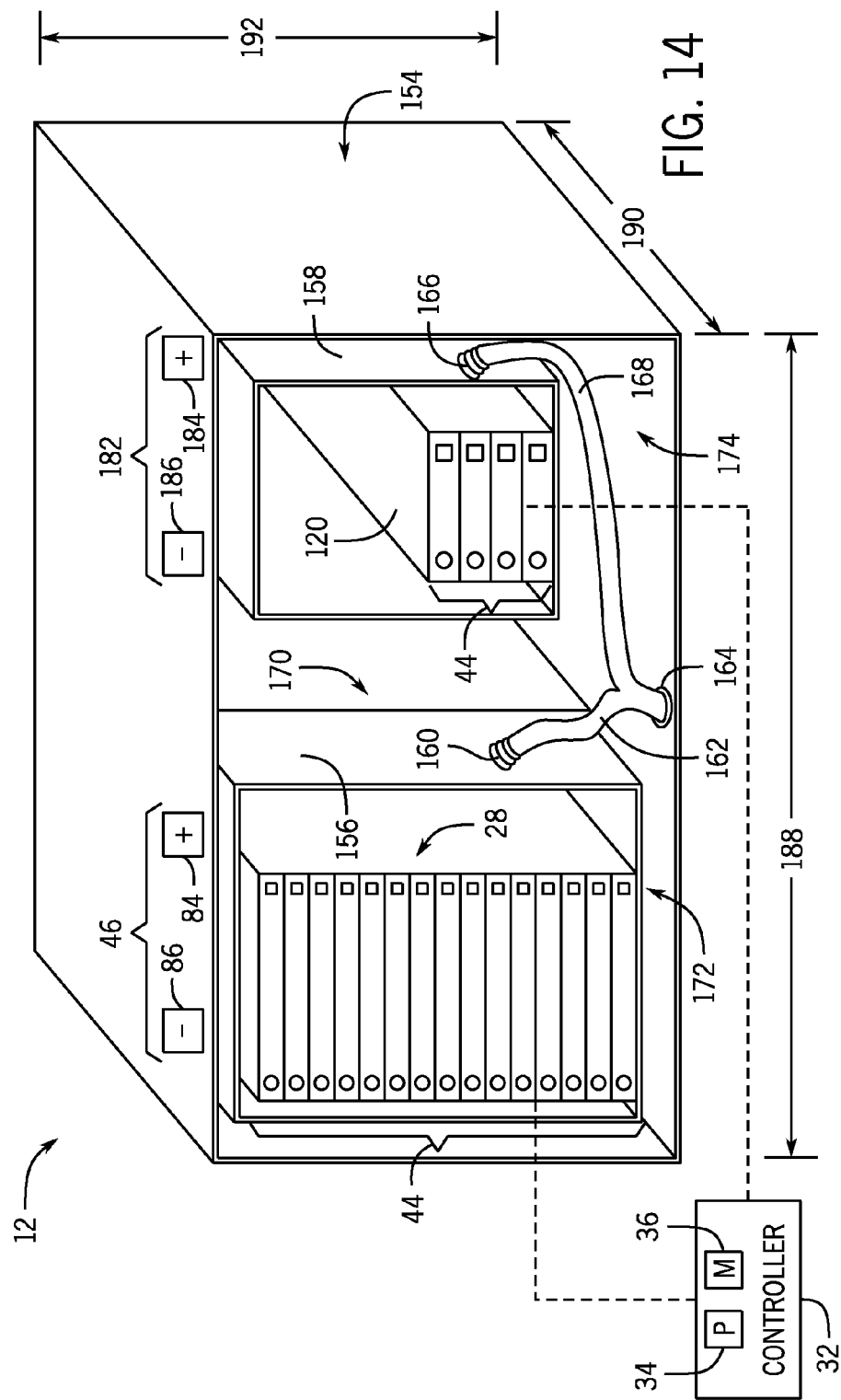
FIG. 14 is a perspective view of another embodiment of the micro-hybrid battery system of FIG. 2 having two lithium ion battery modules, in accordance with an aspect of the present disclosure.

FIG. 14 is a perspective view of another embodiment of the micro-hybrid battery system 12 that has the second HVS/LTO lithium ion battery module (e.g., 12V) 120 and the first HVS/LTO lithium ion battery module (e.g., 48V) 28 in an integrated enclosure 154. As discussed previously, it may be advantageous to include two HVS/LTO lithium ion battery modules in the micro-hybrid battery system 12 to, for example, decrease the size and weight of the micro-hybrid battery system 12 and to increase the life cycle of the micro-hybrid battery system 12. In the illustrated embodiment, the second HVS/LTO lithium ion battery module 120 includes 4 prismatic battery cells 44 to create a voltage of approximately 12V, and the first HVS/LTO lithium ion battery module 28 has 15 prismatic battery cells 44 to create a voltage of approximately 48V. In other embodiments, the second HVS/LTO lithium ion battery module 120 and/or the first HVS/LTO lithium ion battery module 28 may have between 1 and 20 HVS/LTO battery cells.

The micro-hybrid battery system 12 includes the integrated enclosure 154, a first module housing 156 for the first HVS/LTO lithium ion battery module (e.g., 48V) 28, and a second module housing 158 for the second HVS/LTO lithium ion battery module (e.g., 48V) 120. The first module housing 156 may be configured to enclose the 15 battery cells 44 of the first HVS/LTO lithium ion battery module (e.g., 48V) 28 such that the first HVS/LTO lithium ion battery module (e.g., 48V) 28 may be purchased as a single unit. Therefore, a purchaser of the first HVS/LTO lithium ion battery module (e.g., 48V) 28 unit may simply place the unit into the enclosure 154. Similarly, the second module housing 158 may be configured to enclose the 4 battery cells 44 of the second HVS/LTO lithium ion battery module (e.g., 12V) 120 such that the second HVS/LTO lithium ion battery module (e.g., 12V) 120 may be purchased as a single unit. A purchaser of the second HVS/LTO lithium ion battery module (e.g., 12V) 120 may then simply place the second HVS/LTO lithium ion battery module (e.g., 12V) 120 unit into the enclosure 154.

In certain embodiments, the enclosure 154 may be configured such that a purchaser of separate battery modules may create a custom, or unique, micro-hybrid battery system 12 that includes a combination of a lead acid battery module and/or a lithium ion battery module. As will be discussed in detail with respect to FIG. 15, the enclosure 154 may include an in-molded bus that connects the battery modules in parallel such that a purchaser of battery modules can connect the battery modules by simply placing the modules in the enclosure 154 and closing a lid.

In certain embodiments, the first module housing 156 may include a first vent 160. The first vent 160 may allow gases that build within the first module housing 156 to escape so that the pressure within the first module housing 156 does not exceed a certain pressure level (e.g., a threshold pressure). The first vent 160 may be in the form of a barbed fitting as shown in FIG. 14. Alternatively, the first vent 160 may be a hole in the first module housing 156, a check valve, or any other device that may be used to allow fluid to escape from the first module housing 156. In the embodiment shown in FIG. 14, a first vent hose 162 is connected to the barbed fitting and then to an opening 164 in the enclosure 154. Therefore, gas building in the first module housing 156 may flow through the first vent 160, into the first vent hose 162, and out of the opening 164 to the atmosphere or a vent hose of the xEV 10.

Similarly, the second inner housing 158 may include a second vent 166 configured to allow gases that build within the second module housing 158 to escape so that the pressure does not exceed a certain pressure level (e.g., threshold pressure). The second vent 166 may be in the form of a barbed fitting as shown in FIG. 14, a hole in the second module housing 158, a check valve, or any other device that may be used to allow fluid to escape from the second module housing 158. A second vent hose 168 may be connected to the barbed fitting at one end and connected to the first vent hose 162 before the opening 164 at the other end. In other embodiments, a second opening in the enclosure 154 may be included such that the first vent hose 162 couples to the opening 164 and the second vent hose 168 connects to the second opening.

In certain embodiments, the enclosure 154 may include a barrier 170 that creates a first compartment 172 and a second compartment 174 inside the enclosure 154. The first compartment 172 may enclose the first module housing 156 of the first HVS/LTO lithium ion battery module (e.g., 48V) 28, and the second compartment 174 may enclose the second module housing 158 of the second HVS/LTO lithium ion battery module (e.g., 12V) 120.

The micro-hybrid battery system 12 illustrated in FIG. 14 may include the first pair of battery terminals 46 that includes the first positive terminal 84 and the first negative terminal 86. The first pair of battery terminals 46 may be electrically coupled to the first HVS/LTO lithium ion battery module (e.g., 48V) 28. Similarly, a third pair of battery terminals 182 may be included in the micro-hybrid battery system 12 that are electrically coupled to the second HVS/LTO lithium ion battery module (e.g., 12V) 120. The third pair of battery terminals 182 may include a third positive terminal 184 and a third negative terminal 186. The first pair of battery terminals 46 and the third pair of battery terminals 182 may protrude from the enclosure 154 such that they may be connected to components in the vehicle 10 via the bus 26.

In certain embodiments, the enclosure 154 may be constructed to have dimensions that conform to a standard form factor 12V lead acid battery module. Since the micro-hybrid battery system 12 of FIG. 14 includes the second HVS/LTO lithium ion battery module (e.g., 12V) 120 and the first HVS/LTO lithium ion battery module (e.g., 48V) 28, the micro-hybrid battery system 12 may be smaller than, or at least the same size as, a standard 12V lead acid battery module because fewer battery cells are included. In certain embodiments, the enclosure 154 may have a length 188, width 190, and height 192 conforming to a standard 12V lead acid battery module form factor. Constructing the outer housing 154 such that it has the same dimensions as a standard 12V lead acid battery may enable the micro-hybrid battery system 12 to be installed directly in a location of the vehicle 10 intended for a standard 12V lead acid battery module. In certain embodiments, the standard form factor of a 12V lead acid battery module may be a Battery Council International group designation 21, 22F, 22HF, 22NF, 22R, 24, 24F, 24H, 24R, 24T, 25, 26, 26R, 27, 27F, 27H, 29NF, 31, 31A, 31T, 33, 34, 34/78, 34R, 35, 36R, 40R, 41, 42, 43, 45, 46, 47, 48, 49, 50, 51, 51R, 52, 53, 54, 55, 56, 57, 58, 58R, 59, 60, 61, 62, 63, 64, 65, 70, 71, 72, 73, 74, 75, 75/25, 76, 78, 85, 86, 90, 91, 92, 93, 95R, 96R, 97R, 98R, 1, 2, 2E, 2N, 17HF, 4D, 6D, 8D, 28, 29H, 30H, 31, GC2, or GC2H.

Further, the second HVS/LTO lithium ion battery module (e.g., 12V) 120 and the first HVS/LTO lithium ion battery module (e.g., 48V) 28 may be coupled to the control unit 32. The control unit 32 may be coupled to various sensors that are included in the first module housing 156 and the second module housing 158. For example, sensors may monitor the temperature, voltage, capacitance, resistance, cell pressure, or other operating conditions of the second HVS/LTO lithium ion battery module (e.g., 12V) 120 and/or the first HVS/LTO lithium ion battery module (e.g., 48V) 28. The sensors may send signals to the control unit 32, which may include the processor units 34 and the memory components 36. The control unit 32 may compare a measured operating condition to a desired operating condition. If the measured operating condition is too high or too low in comparison to the desired operating condition, the control unit 32 may send a signal to a relay or other device configured to stop the flow of electricity from the second HVS/LTO lithium ion battery module (e.g., 12V) 120 and/or the first HVS/LTO lithium ion battery module (e.g., 48V) 28. For example, if the control unit 32 receives a temperature value from a thermocouple sensor signaling that the first HVS/LTO lithium ion battery module (e.g., 48V) 28 is overheating, the control unit 32 may send a signal to a relay commanding the relay to open and disconnect the flow of electricity. In the embodiment shown in FIG. 14, the control unit 32 is electrically coupled to both the second HVS/LTO lithium ion battery module (e.g., 12V) 120 and the first HVS/LTO lithium ion battery module (e.g., 48V) 28. In other embodiments, a second control unit may be included such that the control unit 32 controls only one of the second HVS/LTO lithium ion battery module (e.g., 48V) 120 or the first HVS/LTO lithium ion battery module (e.g., 48V) 28, and the second controller controls the other. In certain embodiments, the micro-hybrid battery system shown in FIG. 14 may have a capacitance between 5 Ah and 100 Ah.

Figure 15:
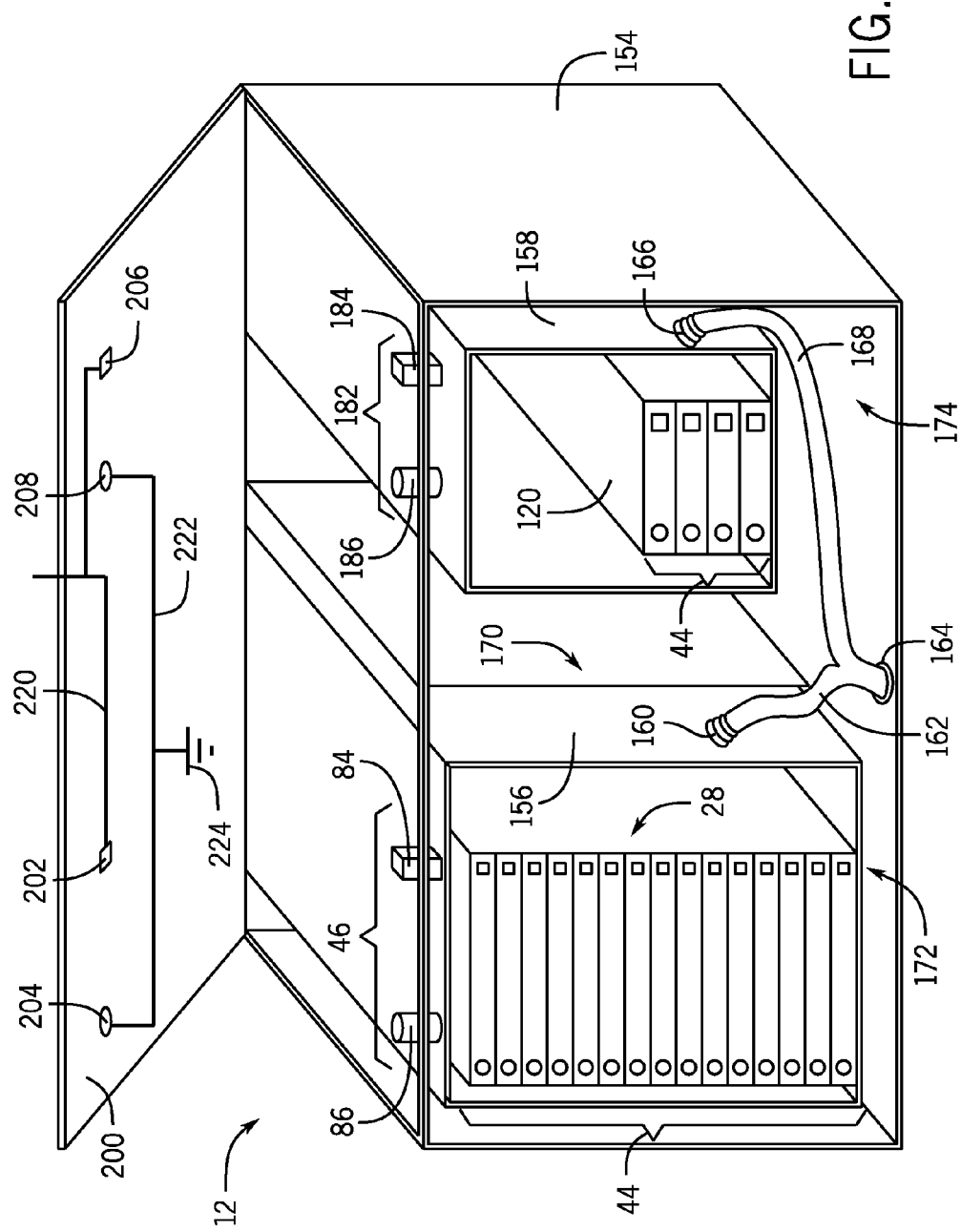
FIG. 15 is a perspective view of the micro-hybrid battery system of FIG. 14 with a cover in an open position, in accordance with an aspect of the present disclosure.

FIG. 15 is a perspective view of the micro-hybrid battery system 12 of FIG. 14 with a cover 200 of the enclosure 154 in an open position. In certain embodiments, the first pair of battery terminals 46 may protrude from the first module housing 156 and into the first compartment 172. In certain embodiments, the first positive terminal 84 and the first negative terminal 86 may be coupled to a first positive electrical contact 202 and a first negative electrical contact 204, respectively. In certain embodiments, the first positive electrical contact 202 and the first negative electrical contact 204 may be disposed on the cover 200. Similarly, the third pair of battery terminals 182 may protrude from the second module housing 158 and into the second compartment 174. In certain embodiments, the third positive terminal 184 and the third negative terminal 186 may be coupled to a second positive electrical contact 206 and a second negative electrical contact 208, respectively. In certain embodiments, the second positive electrical contact 206 and the second negative electrical contact 208 may be disposed on the cover 200.

In certain embodiments, the enclosure 154 is configured such that when the first HVS/LTO lithium ion battery module (e.g., 48V) 28 is placed in the first compartment 172 of the enclosure 154, the first positive terminal 84 aligns with the first positive electrical contact 202 and the first negative terminal 86 aligns with the first negative electrical contact 204. Therefore, when the cover 200 of the enclosure 154 is closed, an electrical connection is formed between the first positive electrical contact 202 and the first positive terminal 84 and between the first negative electrical contact 204 and the first negative terminal 86. Similarly, the enclosure 154 may be configured such that when the second HVS/LTO lithium ion battery module (e.g., 48V) 120 is placed in the second compartment 174 of the enclosure 154, the third positive terminal 184 aligns with the second positive electrical contact 206 and the third negative terminal 186 aligns with the second negative electrical contact 208. Therefore, when the cover 200 of the enclosure 154 is closed, an electrical connection may be formed between the second positive electrical contact 206 and the third positive terminal 184 and between the second negative electrical contact 208 and the third negative terminal 186.

In certain embodiments, an in-molded bus may be disposed on the cover 200. The in-molded bus may include a first circuit 220 and a second circuit 222. In certain embodiments, the first circuit 220 may couple the first positive electrical contact 202 and the second positive electrical contact 206. Additionally, the second circuit 222 may couple the first negative electrical contact 204 and the second negative electrical contact 208. The second circuit 222 may also couple the first negative electrical contact 204 and the second negative electrical contact 208 to a ground 224. In certain embodiments, the coupling of the electrical contacts 202, 204, 206, and 208 may connect the second HVS/LTO lithium ion battery module (e.g., 48V) 120 and the first HVS/LTO lithium ion battery module (e.g., 48V) 28 in a parallel configuration. Therefore, the micro-hybrid battery system 12 may be connected to various components of the vehicle 10 via the bus 26, and electricity may be supplied to the components from either, or both of, the second HVS/LTO lithium ion battery module (e.g., 48V) 120 and the first HVS/LTO lithium ion battery module (e.g., 48V) 28.

One or more of the disclosed embodiments, alone or on combination, may provide one or more technical effects including the manufacture of battery modules that have a longer life cycle, less weight, and less size, but comparable power output, to lead acid battery modules. Such battery modules may reduce the weight of xEVs and increase fuel efficiency. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A micro-hybrid battery system, comprising:
   a lithium ion micro-hybrid battery module, comprising:
      a first pair of battery terminals;
      a lithium ion battery cell coupled to the first pair of battery terminals, wherein the lithium ion battery cell comprises a cathode and an anode, wherein the anode comprises an anode active material comprising a titanate-based oxide with spinel structure and the cathode comprises a cathode active material comprising high voltage spinel having a formula $LiMn_{2-x}M_xO_4$, and wherein M is nickel, chromium, iron, a transition metal, or any combination thereof and x is between 0.35 and 0.65;
   an energy storage unit comprising a second pair of battery terminals;
   a housing configured to house the lithium ion micro-hybrid battery module and the energy storage unit; and
   a cover hingedly coupled to the housing and configured to enclose the lithium ion micro-hybrid battery module and the energy storage unit in the housing when the cover is in a first position, wherein the cover comprises an in-molded bus configured to electrically couple the lithium ion micro-hybrid battery module and the energy storage unit via contact between the in-molded bus and the first pair of battery terminals and the second pair of battery terminals when the cover is in the first position, and wherein the in-molded bus is configured to separate from the first pair of battery terminals and the second pair of battery terminals to electrically disconnect the lithium ion micro-hybrid battery module from the energy storage unit when the cover is in a second position;
   a control circuit configured to enable the lithium ion battery cell to be electrically connected in parallel to the energy storage unit such that the lithium ion micro-hybrid battery module is configured to work in a start-stop application.

2. The micro-hybrid battery system of claim 1, wherein the energy storage unit comprises a lead-acid battery.

3. The micro-hybrid battery system of claim 2, wherein the lithium ion micro-hybrid battery module comprises 15 lithium ion battery cells coupled to the first pair of battery terminals such that the lithium ion micro-hybrid battery module is configured to provide approximately 48V via the pair of battery terminals, and wherein the lead-acid battery comprises a voltage of approximately 12V.

4. The micro-hybrid battery system of claim 2, wherein the lithium ion micro-hybrid battery module is configured to capture energy from an alternator or an electric motor via a regenerative braking system.

5. The micro-hybrid battery system of claim 1, wherein the lithium ion micro-hybrid battery module is configured to provide approximately 48V via the first pair of battery terminals.

6. The micro-hybrid battery system of claim 1, wherein the lithium ion micro-hybrid battery module has a capacity between 5 Ah and 100 Ah.

7. The micro-hybrid battery system of claim 1, wherein the energy storage unit comprises a total capacity between 5 Ah and 100 Ah.

8. A micro-hybrid battery system, comprising:
   a housing comprising an enclosure;
   a lithium ion battery module, comprising:
      a first pair of battery terminals; and
      a battery cell coupled to the first pair of battery terminals, wherein the battery cell comprises a cathode and an anode, wherein the anode comprises an anode active material comprising a titanate-based oxide with spinel structure and the cathode comprises a cathode active material comprising high voltage spinel having a formula $LiMn_{2-x}M_xO_4$, and wherein M is nickel, chromium, iron, a transition metal, or any combination thereof and x is between 0.35 and 0.65;
   a lead acid battery module comprising a second pair of battery terminals, wherein the lithium ion battery module and the lead acid battery module are coupled in parallel via the first pair of battery terminals and the second pair of battery terminals;
   a control module coupled to the lithium ion battery module, wherein the control module comprises a processor and a memory component, and wherein the control module is configured to control operations of the lithium ion battery module such that the lithium ion battery module is configured to capture electrical energy via a regenerative braking system of an xEV;
   a cover hingedly coupled to the housing and configured to enclose the enclosure of the housing when the cover is in a first position, wherein the cover comprises an in-molded bus configured to electrically couple the lithium ion battery module and the lead acid battery module via contact between the in-molded bus and the first pair of battery terminals and the second pair of battery terminals when the cover is in the first position, and wherein the in-molded bus is configured to separate from the first pair of battery terminals and the second pair of battery terminals to electrically disconnect the lithium ion battery module from the lead acid battery module when the cover is in a second position; and a connector configured to couple the lithium ion battery module and the lead acid battery module to an electrical bus of the xEV.

9. The micro-hybrid battery system of claim 8, wherein the titanate-based oxide with spinel structure is lithium titanate having a chemical formula of $Li_4Ti_5O_{12}$.

10. The micro-hybrid battery system of claim 8, wherein the lead acid battery module is a 12V lead acid battery that conforms to a standard form factor.

11. The micro-hybrid battery system of claim 10, wherein the standard form factor comprises at least one group selected from Battery Council International groups 21, 22F, 22HF, 22NF, 22R, 24, 24F, 24H, 24R, 24T, 25, 26, 26R, 27, 27F, 27H, 29NF, 31, 31A, 31T, 33, 34, 34/78, 34R, 35, 36R, 40R, 41, 42, 43, 45, 46, 47, 48, 49, 50, 51, 51R, 52, 53, 54, 55, 56, 57, 58, 58R, 59, 60, 61, 62, 63, 64, 65, 70, 71, 72, 73, 74, 75, 75/25, 76, 78, 85, 86, 90, 91, 92, 93, 95R, 96R, 97R, 98R, 1, 2, 2E, 2N, 17HF, 4D, 6D, 8D, 28, 29H, 30H, 31, GC2, and GC2H.

12. A micro-hybrid battery system, comprising:

a housing comprising a first compartment and a second compartment;

a lithium ion battery module disposed in the first compartment, wherein the lithium ion battery module comprises a first pair of battery terminals and a plurality of lithium ion battery cells, each lithium ion battery cell of the plurality of lithium ion battery cells comprises an anode and a cathode, the anode comprises a cathode active material comprising a titanate-based oxide with spinel structure, and the cathode comprises a cathode active material comprising high voltage spinel having a formula $LiMn_{2-x}M_xO_4$, and wherein M is nickel, chromium, iron, a transition metal, or any combination thereof and x is between 0.35 and 0.65;

a second battery module disposed in the second compartment, wherein the second battery module comprises a second pair of battery terminals;

a cover hingedly coupled to the housing and configured to enclose the first compartment and the second compartment when the cover is in a first position, wherein the cover comprises an in-molded bus configured to electrically couple the lithium ion battery module and the second battery module via contact between the in-molded bus and the first pair of battery terminals and the second pair of battery terminals when the cover is in the first position, and wherein the in-molded bus is configured to separate from the first pair of battery terminals and the second pair of battery terminals to electrically disconnect the lithium ion battery module from the second battery module when the cover is in a second position; and a connector configured to couple the lithium ion battery module and the second battery module to an electrical bus of an xEV.

13. The micro-hybrid battery system of claim 12, wherein the housing comprises a vent, wherein the first compartment comprises a first compartment vent, the second compartment comprises a second compartment vent, and the vent is fluidly coupled to the first compartment vent and the second compartment vent.

14. The micro-hybrid battery system of claim 12, wherein the second battery module is a lead acid battery module.

15. The micro-hybrid battery system of claim 12, wherein the micro-hybrid battery system housing has dimensions that conform to a standard form factor for a 12V lead-acid battery, and wherein the standard form factor comprises at least one group selected from Battery Council International groups 21, 22F, 22HF, 22NF, 22R, 24, 24F, 24H, 24R, 24T, 25, 26, 26R, 27, 27F, 27H, 29NF, 31, 31A, 31T, 33, 34, 34/78, 34R, 35, 36R, 40R, 41, 42, 43, 45, 46, 47, 48, 49, 50, 51, 51R, 52, 53, 54, 55, 56, 57, 58, 58R, 59, 60, 61, 62, 63, 64, 65, 70, 71, 72, 73, 74, 75, 75/25, 76, 78, 85, 86, 90, 91, 92, 93, 95R, 96R, 97R, 98R, 1, 2, 2E, 2N, 17HF, 4D, 6D, 8D, 28, 29H, 30H, 31, GC2, and GC2H.

* * * * *

UNITED STATES PATENT AND TRADEMARK OFFICE
CERTIFICATE OF CORRECTION

PATENT NO. : 9,997,816 B2
APPLICATION NO. : 14/584798
DATED : June 12, 2018
INVENTOR(S) : Yongkyu Son et al.

Page 1 of 1

It is certified that error appears in the above-identified patent and that said Letters Patent is hereby corrected as shown below:

On the Title Page

1. In Item (71), under "Applicant", in Column 3, Line 2, delete "Holland" and insert --Auburn Hills--, therefore.

In the Specification

2. In Column 1, Line 40, delete "hybrid systems" and insert --hybrid electric vehicles--, therefor.

3. In Column 1, Line 43, delete "hybrid systems" and insert --hybrid electric vehicles--, therefor.

4. In Column 3, Line 30, delete "DRAWINGS" and insert --BRIEF DESCRIPTION OF DRAWINGS--, therefor.

5. In Column 5, Line 61, delete "$LiM_xMn_{2-x}O_4$," and insert --$LiMn_{2-x}M_xO_4$,--, therefor.

6. In Column 6, Line 7, delete "Li/Li+" and insert --Li/Li+.--, therefor.

7. In Column 13, Line 24, delete "bather 102." and insert --barrier 102.--, therefor.

In the Claims

8. In Column 19, Line 59, in Claim 1, delete "unit; and" and insert --unit;--, therefor.

9. in Column 20, Line 7, in Claim 1, delete "position;" and insert --position; and--, therefor.

Signed and Sealed this
Eighteenth Day of December, 2018

Andrei Iancu
*Director of the United States Patent and Trademark Office*